United States Patent
Ohba et al.

(10) Patent No.: US 10,404,911 B2
(45) Date of Patent: Sep. 3, 2019

(54) IMAGE PICKUP APPARATUS, INFORMATION PROCESSING APPARATUS, DISPLAY APPARATUS, INFORMATION PROCESSING SYSTEM, IMAGE DATA SENDING METHOD, IMAGE DISPLAYING METHOD, AND COMPUTER PROGRAM FOR DISPLAYING SYNTHESIZED IMAGES FROM A PLURALITY OF RESOLUTIONS

(71) Applicant: Sony Interactive Entertainment Inc., Tokyo (JP)

(72) Inventors: Akio Ohba, Kanagawa (JP); Hidehiko Ogasawara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/868,061

(22) Filed: Jan. 11, 2018

(65) Prior Publication Data
US 2018/0139383 A1 May 17, 2018

Related U.S. Application Data

(62) Division of application No. 15/232,180, filed on Aug. 9, 2016, now Pat. No. 9,936,130.

(30) Foreign Application Priority Data

Sep. 29, 2015 (JP) ................. 2015-192144

(51) Int. Cl.
*H04N 5/232* (2006.01)
*H04N 7/01* (2006.01)
(Continued)

(52) U.S. Cl.
CPC ....... *H04N 5/23232* (2013.01); *G02B 27/017* (2013.01); *G06K 9/00* (2013.01);
(Continued)

(58) Field of Classification Search
CPC ............. H04N 5/23232; H04N 13/344; H04N 7/0127; H04N 13/204; G06K 9/0002;
(Continued)

(56) References Cited

U.S. PATENT DOCUMENTS 7,782,362 B2 * 8/2010 Oshima ............... H04N 3/1575
348/208.13
8,855,712 B2 10/2014 Lord et al.
(Continued)

FOREIGN PATENT DOCUMENTS

EP 0 999 518 5/2000

OTHER PUBLICATIONS

United States Office Action dated Jul. 26, 2017, from corresponding U.S. Appl. No. 15/232,180.

(Continued)

*Primary Examiner* — Padma Haliyur
(74) *Attorney, Agent, or Firm* — Katten Muchin Rosenman LLP

(57) ABSTRACT

An image pickup apparatus includes an image data production unit which produces data of images of a plurality of resolutions, from an image frame obtained by picking up an image of a target object as a moving picture for each pixel string which configures a row, and an image sending unit which extracts, from the data of the images of the plurality of resolutions, pixel strings of a region requested from a host terminal and connect the extracted pixel strings for each number of pixels determined in accordance with a given rule to produce a stream and then transmit the stream to the host terminal. The image sending unit adjusts a connection pixel number of data of an image of a particular resolution such that, where N is an integer, data for 1/(N+1) frame are transmitted with respect to one frame of data of an image of the other resolution.

12 Claims, 19 Drawing Sheets

(51) Int. Cl.
 G06K 9/00 (2006.01)
 G06T 3/40 (2006.01)
 G02B 27/01 (2006.01)
 H04N 13/344 (2018.01)
 H04N 13/204 (2018.01)

(52) U.S. Cl.
 CPC .............. *G06K 9/0002* (2013.01); *G06T 3/40* (2013.01); *H04N 7/0127* (2013.01); *H04N 13/344* (2018.05); *G02B 2027/014* (2013.01); *G02B 2027/0138* (2013.01); *G02B 2027/0147* (2013.01); *G02B 2027/0187* (2013.01); *H04N 13/204* (2018.05)

(58) Field of Classification Search
 CPC .. G06K 9/00; G02B 27/017; G02B 2027/014; G02B 2027/0147; G02B 2027/0187; G02B 2027/0138; G06T 3/40
 See application file for complete search history.

(56) References Cited

U.S. PATENT DOCUMENTS

| | | | |
|---|---|---|---|
| 2006/0098899 A1 | 5/2006 | King et al. | |
| 2010/0309226 A1* | 12/2010 | Quack | G06F 17/30244 345/634 |
| 2014/0071244 A1* | 3/2014 | Hirota | H01L 27/14627 348/46 |

OTHER PUBLICATIONS

United States Notice of Allowance dated Nov. 24, 2017, from corresponding U.S. Appl. No. 15/232,180.

\* cited by examiner

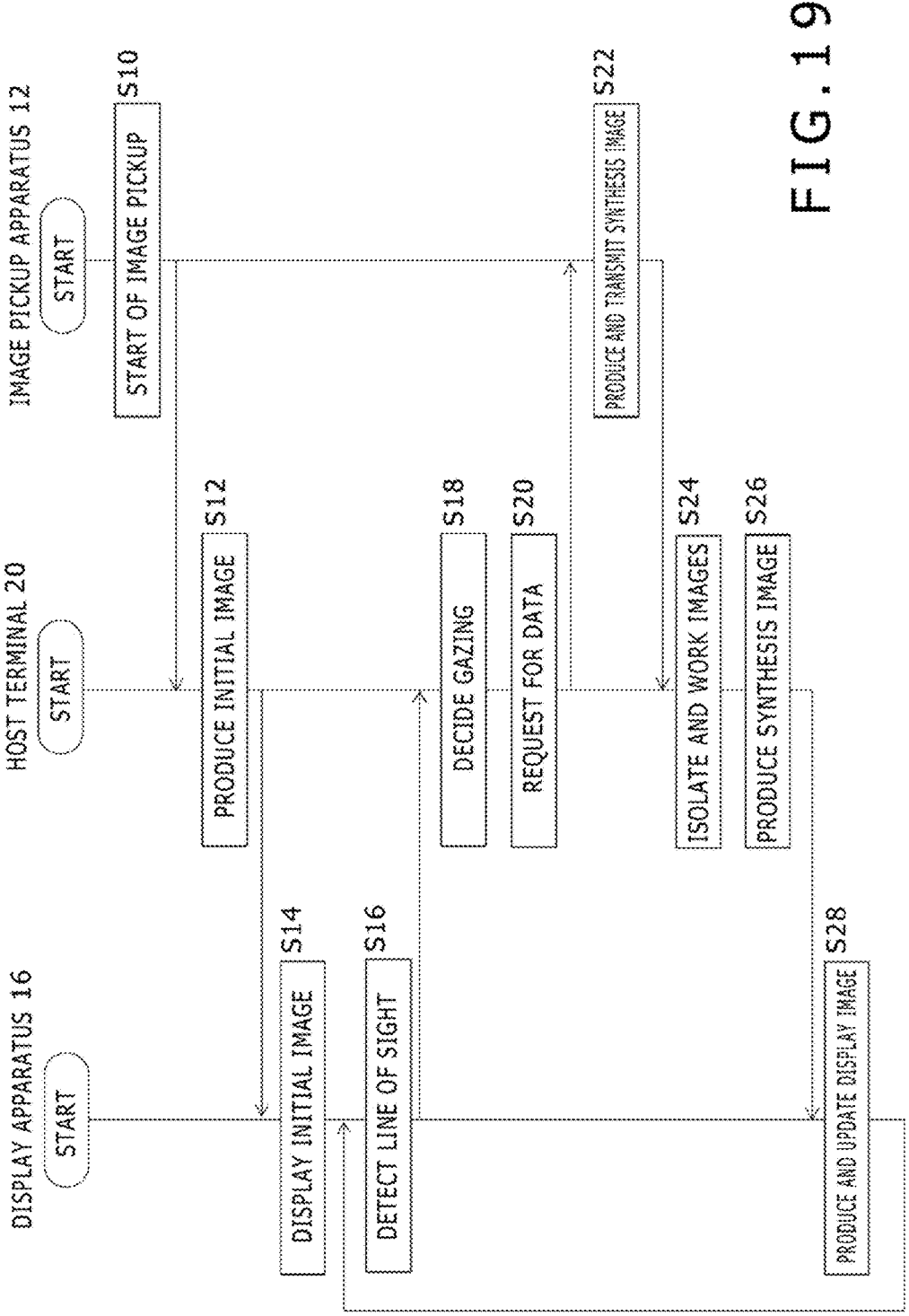

IMAGE PICKUP APPARATUS, INFORMATION PROCESSING APPARATUS, DISPLAY APPARATUS, INFORMATION PROCESSING SYSTEM, IMAGE DATA SENDING METHOD, IMAGE DISPLAYING METHOD, AND COMPUTER PROGRAM FOR DISPLAYING SYNTHESIZED IMAGES FROM A PLURALITY OF RESOLUTIONS

BACKGROUND

The present technology relates to a transmission and processing technology of image data involved in displaying of a picked up image or a rendered image.

A game is known wherein an image of part of the body of a user such as the head is picked up by a video camera and a predetermined region such as an eye, a mouth, or a hand is extracted and then the extracted region is replaced with a different image and displayed in this state on a display unit (refer, for example, to European Patent Application Publication No. 0999518). Also a user interface system is known wherein a movement of a mouth or a hand imaged by a video camera is received as an operation instruction of an application. A technology for picking up an image of the actual world and displaying a virtual world reacting with the movement in the actual world or performing some information processing is utilized in a wide field from a small-sized portable terminal to leisure facilities irrespective of the scale.

SUMMARY

In order to implement an image representation with realistic sensation or perform information processing with high accuracy, it is desired to increase the resolution and the frame rate of a picked up image or a display image. However, since the increase of the resolution or the frame rate increases the data amount to be processed, it causes a problem in terms of the immediacy or the responsiveness. In particular, even if it is tried to increase the resolution and the frame rate, if the processing speed in an apparatus or the data transmission speed between apparatus are insufficient, then the latency from image pickup to display increases. Especially in a mode in which a movement in the actual world is immediately reflected on information processing or a display image, the increase of the latency is likely to be actualized.

The present technology has been made on the basis of the recognition of the above problems by the present inventor. It is desirable to provide a technology, in an information processing system which involves pickup and display of an image, to reduce latency arising from processing or transmission in the inside of the system.

According to an embodiment of the present technology, there is provided an image pickup apparatus including an image data production unit configured to produce data of images of a plurality of resolutions, from an image frame obtained by picking up an image of a target object as a moving picture for each pixel string which configures a row, and an image sending unit configured to extract, from the data of the images of the plurality of resolutions, pixel strings of a region requested from a host terminal and connect the extracted pixel strings for each number of pixels determined in accordance with a given rule to produce a stream and then transmit the stream to the host terminal. The image sending unit adjusts a connection pixel number of data of an image of a particular resolution such that, where N is an integer, data for 1/(N+1) frame are transmitted with respect to one frame of data of an image of an other resolution.

According to another embodiment of the present technology, there is provided an information processing apparatus including an image acquisition unit configured to acquire data of images of a plurality of resolutions to be synthesized and displayed as an image frame which configures a moving picture, an image extraction unit configured to connect pixel strings, which configure rows of the images of the plurality of resolutions, for each number of pixels determined by a given rule to produce a stream, and a communication unit configured to transmit the stream to a display apparatus. The image extraction unit adjusts a connection pixel number of data of an image of a particular resolution such that, where N is an integer, data for 1/(N+1) frame are transmitted with respect to one frame of data of an image of an other resolution.

According to a further embodiment of the present technology, there is provided a display apparatus including a communication unit configured to receive, from a host terminal, a stream in which pixel strings configuring rows of images of a plurality of resolutions to be synthesized and displayed as an image frame which configures a moving picture are connected for each number of pixels determined by a given rule and which is adjusted such that, where N is an integer, a connection pixel number of data of an image of a particular resolution are received by 1/(N+1) frame with respect to one frame of data of an image of an other resolution, and a display unit configured to synthesize the images of the plurality of resolutions included in the received stream to produce and display the image frame. The display unit completes, for a region of the image frame in which the data of the image of the particular resolution are to be used, updating of the data for 1/(N+1) frame where updating regarding an other region is performed for one frame.

According to a still further embodiment of the present technology, there is provided an information processing system including an image pickup apparatus, a host terminal, and a display apparatus which cooperatively perform display of a moving picture based on an image frame obtained by picking up an image of a target object as a moving picture. The image pickup apparatus includes an image data production unit configured to produce data of images of a plurality of resolutions from the image frame for each pixel string which configures a row, and an image sending unit configured to extract, from the data of the images of the plurality of resolutions, pixel strings of a region requested from the host terminal and connect the extracted pixel strings for each number of pixels determined in accordance with a given rule to produce a stream and then transmit the stream to the host terminal. The host terminal includes an image processing unit configured to classify the stream transmitted from the image pickup apparatus for each resolution of an image and perform a given process for the individual resolutions to produce data of images of a plurality of resolutions to be used for display, an image extraction unit configured to connect pixel strings, which configure rows of the images of the plurality of resolutions, for each number of pixels determined by a given rule to produce a stream, and a communication unit configured to transmit the stream to the display apparatus. Both of the image sending unit of the image pickup apparatus and the image extraction unit of the host terminal adjust a connection pixel number of data of an image of a particular resolution in the stream such that, where N is an integer, data for 1/(N+1) frame are transmitted with respect to one frame of data of an image of an other resolution.

According to a yet further embodiment of the present technology, there is provided an image data sending method by an image pickup apparatus, including producing data of images of a plurality of resolutions, from an image frame obtained by picking up an image of a target object as a moving picture for each pixel string which configures a row, and extracting, from the data of the images of the plurality of resolutions, pixel strings of a region requested from a host terminal and connecting the extracted pixel strings for each number of pixels determined in accordance with a given rule to produce a stream and then transmitting the stream to the host terminal. The transmitting adjusts a connection pixel number of data of an image of a particular resolution such that, where N is an integer, data for 1/(N+1) frame are transmitted with respect to one frame of data of an image of an other resolution.

According to a yet further embodiment of the present technology, there is provided an image data sending method by an information processing apparatus, including acquiring data of images of a plurality of resolutions to be synthesized and displayed as an image frame which configures a moving picture, connecting pixel strings, which configure rows of the images of the plurality of resolutions, for each number of pixels determined by a given rule to produce a stream, and transmitting the stream to a display apparatus. The producing of the stream adjusts a connection pixel number of data of an image of a particular resolution such that, where N is an integer, data for 1/(N+1) frame are transmitted with respect to one frame of data of an image of an other resolution.

According to a yet further embodiment of the present technology, there is provided an image displaying method by a display apparatus, including receiving, from a host terminal, a stream in which pixel strings configuring rows of images of a plurality of resolutions to be synthesized and displayed as an image frame which configures a moving picture are connected for each number of pixels determined by a given rule and which is adjusted such that, where N is an integer, a connection pixel number of data of an image of a particular resolution are received by 1/(N+1) frame with respect to one frame of data of an image of an other resolution, and synthesizing the images of the plurality of resolutions included in the received stream to produce and display the image frame. The displaying completes, for a region of the image frame in which the data of the image of the particular resolution are to be used, updating of the data for 1/(N+1) frame where updating regarding an other region is performed for one frame.

According to a yet further embodiment of the present technology, there is provided a computer program for a computer, including by an image data production unit, producing data of images of a plurality of resolutions, from an image frame obtained by picking up an image of a target object as a moving picture for each pixel string which configures a row, and by an image sending unit, extracting, from the data of the images of the plurality of resolutions, pixel strings of a region requested from a host terminal and connecting the extracted pixel strings for each number of pixels determined in accordance with a given rule to produce a stream and then transmitting the stream to the host terminal. The transmitting adjusts a connection pixel number of data of an image of a particular resolution such that, where N is an integer, data for 1/(N+1) frame are transmitted with respect to one frame of data of an image of an other resolution.

According to a yet further embodiment of the present technology, there is provided a computer program for a computer, including by an image acquisition unit, acquiring data of images of a plurality of resolutions to be synthesized and displayed as an image frame which configures a moving picture, by an image extraction unit, connecting pixel strings, which configure rows of the images of the plurality of resolutions, for each number of pixels determined by a given rule to produce a stream, and by a communication unit, transmitting the stream to a display apparatus. The producing of the stream adjusts a connection pixel number of data of an image of a particular resolution such that, where N is an integer, data for 1/(N+1) frame are transmitted with respect to one frame of data of an image of an other resolution.

According to a yet further embodiment of the present technology, there is provided a computer program for a computer, including by a communication unit, receiving, from a host terminal, a stream in which pixel strings configuring rows of images of a plurality of resolutions to be synthesized and displayed as an image frame which configures a moving picture are connected for each number of pixels determined by a given rule and which is adjusted such that, where N is an integer, a connection pixel number of data of an image of a particular resolution are received by 1/(N+1) frame with respect to one frame of data of an image of an other resolution, and by a display unit, synthesizing the images of the plurality of resolutions included in the received stream to produce and display the image frame. The displaying completes, for a region of the image frame in which the data of the image of the particular resolution are to be used, updating of the data for 1/(N+1) frame where updating regarding an other region is performed for one frame.

It is to be noted that also arbitrary combinations of the components described above and those obtained by converting representations of the present technology between methods, apparatus, systems, computer programs, recording media in or on which any of the computer programs is recorded and so forth are effectively applied as different modes of the present technology.

With the present technology, information processing that involves image pickup or display can be performed with low latency irrespective of the resolution or the frame rate.

The above and other objects, features and advantages of the present technology will become apparent from the following description and the appended claims, taken in conjunction with the accompanying drawings in which like parts or elements denoted by like reference characters.

BRIEF DESCRIPTION OF THE DRAWINGS

FIG. 19 is a flow chart illustrating a processing procedure from image pickup by the image pickup apparatus to image display by the display apparatus.

DETAILED DESCRIPTION OF THE PREFERRED EMBODIMENT

Figure 1:
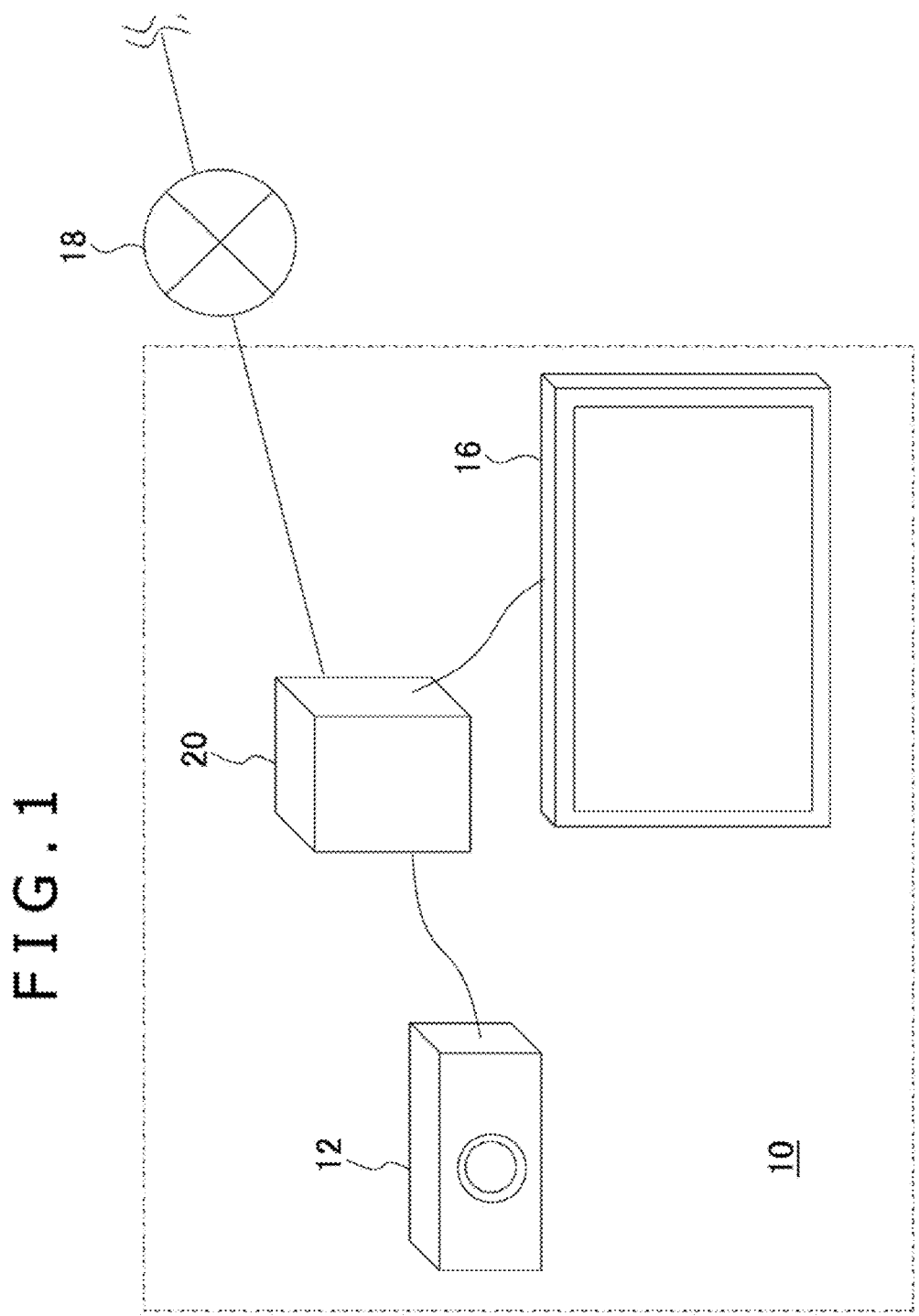
FIG. 1 is a view depicting an example of a configuration of an information processing system to which an embodiment can be applied.

FIG. 1 depicts an example of a configuration of an information processing system to which an embodiment of the present technology can be applied. Referring to FIG. 1, an information processing system 10 includes an image pickup apparatus 12, a host terminal 20, and a display apparatus 16. The image pickup apparatus 12 picks up an image of an image pickup object. The host terminal 20 carries out information processing in accordance with a request of the user on the basis of images picked up by the image pickup apparatus 12. The display apparatus 16 displays an image obtained by the processing by the host terminal 20. The host terminal 20 may be connectable to a network 18 such as the Internet.

The host terminal 20, the image pickup apparatus 12, the display apparatus 16, and the network 18 may be connected to each other by a wire cable or may be connected by wireless connection by a wireless local area network (LAN) or the like. Two or all of the image pickup apparatus 12, the host terminal 20, and the display apparatus 16 may be combined into and equipped as a unitary member. The information processing system 10 may be implemented, for example, from a camera, a portable terminal or the like which includes the components described above. In any case, the apparent shapes of the image pickup apparatus 12, the host terminal 20, and the display apparatus 16 are not limited to those depicted in FIG. 1.

The image pickup apparatus 12 includes a camera for picking up an image of an image pickup object at a predetermined frame rate and a mechanism for performing a demosaic process and a reduction process for output data of the camera to produce a plurality of kinds of image data for each frame. The camera includes a visible light sensor used in general digital cameras and digital video cameras such as a charge coupled device (CCD) sensor or a complementary metal oxide semiconductor (CMOS) sensor. Alternatively, a distance image sensor configured from a combination of an infrared light irradiation element and an infrared light sensor may be combined with a general visible light sensor.

The image pickup apparatus 12 may have a stereo camera wherein two cameras are disposed on the left and right in a spaced relationship by a known distance from each other. Data of images picked up and produced by the image pickup apparatus 12 are transmitted in such a stream format as hereinafter described to the host terminal 20. The host terminal 20 carries out necessary information processing using the image data transmitted thereto to produce data of an image to be used for display. The contents of the processing carried out by the host terminal 20 here are not limited especially but are set suitably depending upon a function requested by the user, the contents of the application or the like.

The host terminal 20, for example, performs general face detection or tracking processing for a picked up image to progress a game in which a character on which a movement of the user who is an object is reflected appears or convert a movement of the user into a command input and perform information processing. The host terminal 20 may otherwise render and display a three-dimensional (3D) object on a picked up image to implement augmented reality (AR). In this case, the image pickup object is not limited to the user but may be the interior as viewed from the user side or the like.

The display apparatus 16 displays a result of the processing carried out by the host terminal 20 as an image thereon. The display apparatus 16 may be a television set including a display unit that outputs an image and a speaker that outputs sound and may be, for example, a liquid crystal television set, a plasma television set, or a personal computer (PC) display unit. Alternatively, the display apparatus 16 may be a head-mounted display unit which is mounted on the head of the user and displays an image in front of the eyes of the user.

At this time, a stereo camera may be provided on the image pickup apparatus 12 such that picked up images from the left and right visual points thereby are subjected to processing in accordance with a display method or an application and are displayed in two left and right divisional regions of the screen of the display apparatus 16 to implement a stereoscopic vision. Alternatively, the display apparatus 16 may be implemented using a display mechanism of a portable terminal or a tablet terminal, an electronic finder of a camera or the like such that it is provided integrally with the image pickup apparatus 12 or the host terminal 20.

Since the information processing system 10 of the present embodiment can be applied to various modes in this manner, also the configuration and the appearance shape of each component may be determined suitably in accordance with the application. In the present embodiment, a system is implemented wherein, in any mode, data transmission between the components and internal processing relating to the transmission are made efficient so that immediacy and responsibility of processing and display are less likely to be damaged by increase of the resolution or the frame rate. The following description is given putting the focus especially on a transmission mechanism for image data. As regards a transmission route of image data, transmission from the image pickup apparatus 12 to the host terminal 20 and transmission from the host terminal 20 to the display apparatus 16 are involved. Since the present embodiment can be applied to the routes independently of each other, the data transmission technique from the image pickup apparatus 12 to the host terminal 20 is described first.

Figure 2:
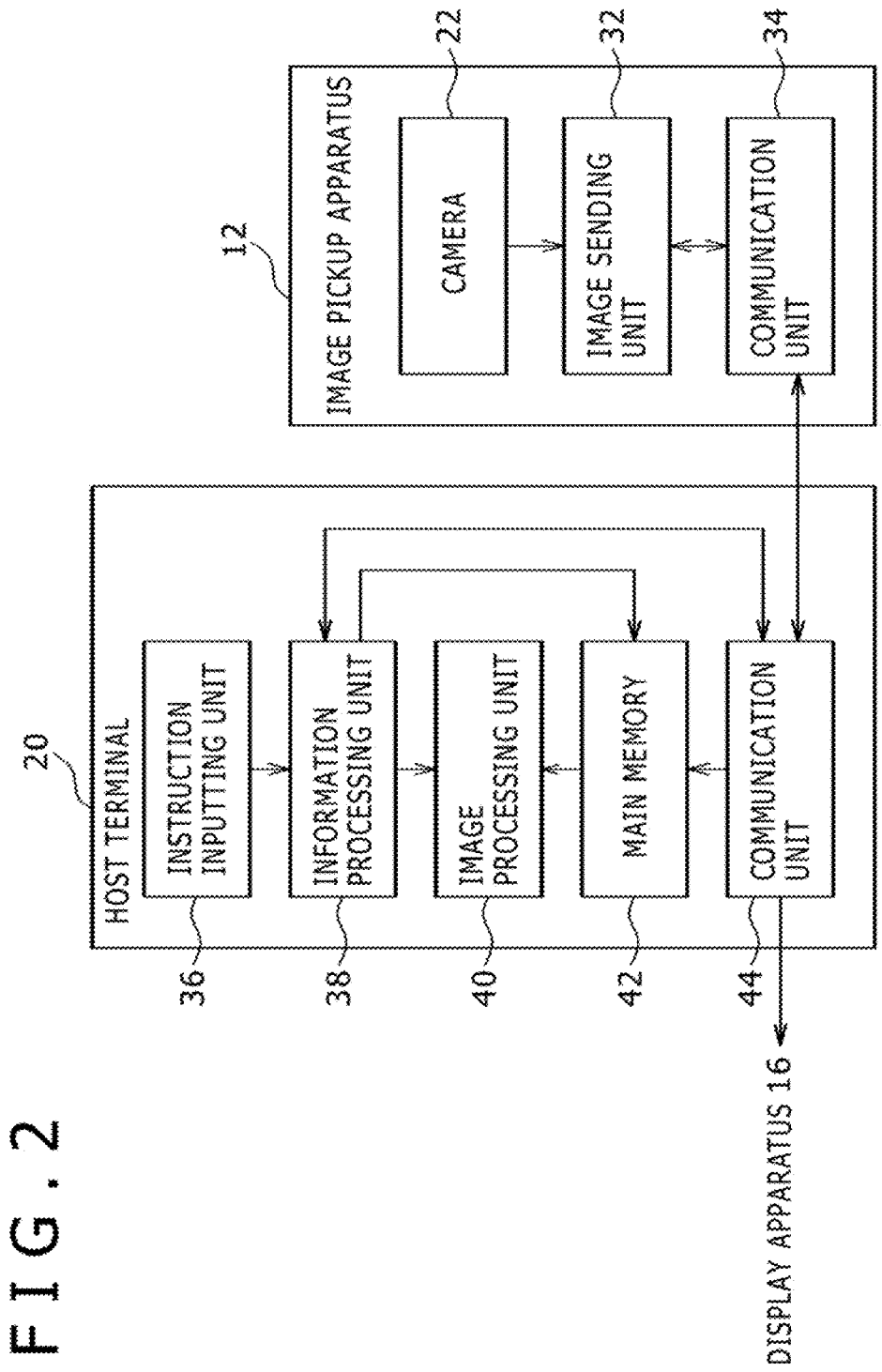
FIG. 2 is a block diagram depicting a configuration of a host terminal and an image pickup apparatus of the information processing system of FIG. 1.

FIG. 2 depicts a configuration of the host terminal 20 and the image pickup apparatus 12. Functional blocks depicted in FIG. 2 and FIGS. 3 to 5 and 13 hereinafter referred to can be implemented from hardware or software. Where the functional blocks are configured from hardware, they can be configured from such components as a central processing unit (CPU), a random access memory (RAM), a read only memory (ROM), a rendering circuit, an image pickup element and so forth. Where the functional blocks are configured from software, they may be implemented by a program loaded from a recording medium or the like into a memory and providing various functions such as a data inputting function, a data retaining function, an image processing function, and a communication function. Accordingly, it can be recognized by those skilled in the art that the functional blocks can be implemented in various forms only from hardware, only from software, or from a combination of hardware and software and are not limited to one of them.

The host terminal 20 includes an instruction inputting unit 36, an information processing unit 38, an image processing unit 40, a main memory 42, and a communication unit 44. The instruction inputting unit 36 acquires an instruction input from the user. The information processing unit 38 totally controls the host terminal 20 and the image pickup apparatus 12 to carry out information processing in accordance with an object. The image processing unit 40 produces an image to be used for display. The main memory 42 stores image data from the image pickup apparatus 12. The communication unit 44 is an interface which carries out transmission and reception of image data and necessary information to and from the image pickup apparatus 12 and the display apparatus 16.

The instruction inputting unit 36 accepts an instruction input from the user and produces and transmits a process requesting signal corresponding to the instruction input to the information processing unit 38. The instruction inputting unit 36 is implemented by cooperation of a general inputting apparatus such as a controller, a button, a keyboard, a mouse, a track ball, and/or a touch panel and a processor that interprets the substance of an operation carried out for the inputting apparatus to produce a process requesting signal, and so forth.

The information processing unit 38 issues a transmission request for image data to the image pickup apparatus 12, a request for image processing to the image processing unit 40 and so forth in accordance with a process requesting signal acquired from the instruction inputting unit 36. Further, the information processing unit 38 develops image data transmitted thereto from the image pickup apparatus 12 in the main memory 42 as hereinafter described in detail. Furthermore, depending upon the substance of a process executed by the information processing system 10, the information processing unit 38 uses image data transmitted thereto from the image pickup apparatus 12 to carry out an image analysis such as stereo matching, tracking of an image pickup object, face detection, or gesture detection. Such image analysis can be implemented by applying a general technology.

The image processing unit 40 uses an image developed in the main memory 42 to carry out image processing in accordance with a request from the information processing unit 38 to produce a display image to be used for display. Data of the produced display image are successively outputted to the display apparatus 16 through the communication unit 44 under the control of the information processing unit 38 and displayed on the display apparatus 16. The communication unit 44 transmits information relating to image data requested by the information processing unit 38 to the image pickup apparatus 12. Further, the communication unit 44 acquires image data transmitted thereto from the image pickup apparatus 12 in accordance with the requesting signal and sends the acquired image data to the information processing unit 38. Furthermore, the communication unit 44 transmits data of an image to be used for display to the display apparatus 16.

The image pickup apparatus 12 includes a camera 22, an image sending unit 32, and a communication unit 34. The camera 22 picks up moving pictures and produces a plurality of kinds of image data. The image sending unit 32 extracts image data requested from the host terminal 20 and produces image data for transmission. The communication unit 34 is an interface for transmission and reception of data from and to the host terminal 20. The camera 22 picks up images of an image pick up object at a predetermined frame rate. Then, the camera 22 reduces the picked up images stepwise to produce image data of a plurality of resolutions for each frame.

The image sending unit 32 extracts, from within image data produced by the camera 22, image data requested by the host terminal 20 and then synthesizes the image data to produce such a virtual synthesis image as hereinafter described. This makes it possible for the host terminal 20 to designate not only a kind of an image but also part of a region of the image so that only the pertaining data can be received. Depending upon a communication method between the host terminal 20 and the image pickup apparatus 12, image data extracted by the image sending unit 32 are suitably packetized.

The communication unit 34 accepts a requesting signal for image data from the host terminal 20 and notifies the image sending unit 32 of the requesting signal. Further, the communication unit 34 transmits image data for transmission produced by the image sending unit 32 to the host terminal 20. The communication unit 34 sends packets to the host terminal 20 in accordance with a predetermined protocol such as, for example, universal serial bus (USB) 3.0. The communication with the host terminal 20 is not limited to wire communication but may be wireless LAN communication such as, for example, IEEE 802.11a/b/g or infrared communication such as infrared data association (IrDA).

Processes to be executed by the image pickup apparatus 12 in the present embodiment are carried out basically in a unit of a pixel string for one horizontal row of an image and is supplied in the unit to a succeeding functional block. As a result, each functional block of the image pickup apparatus 12 may include only a minimal memory capacity, and processes from image pickup to transmission of image data to the host terminal 20 can be carried out with low latency.

Figure 3:
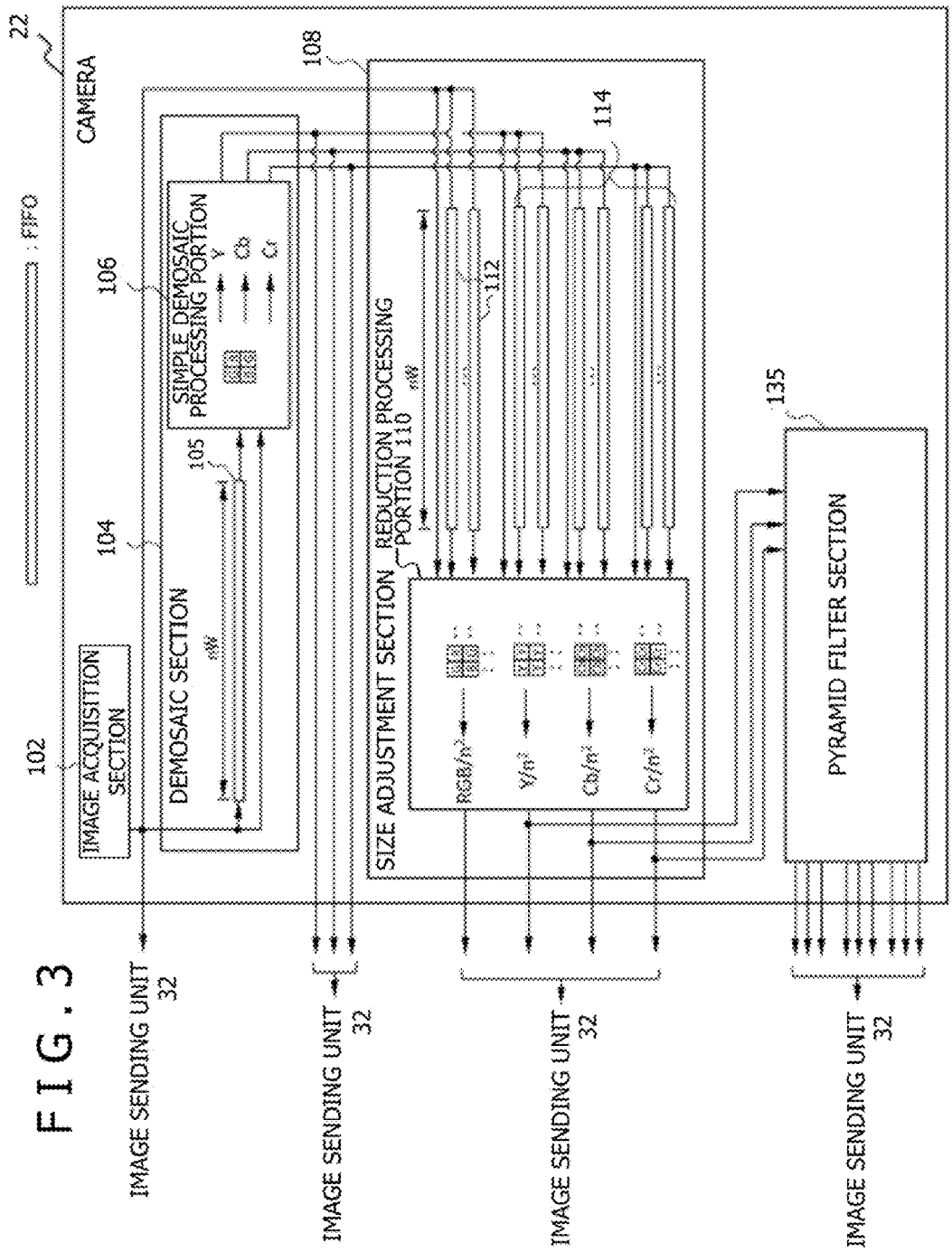
FIG. 3 is a block diagram particularly depicting a configuration of a camera of the image pickup apparatus depicted in FIG. 2.

FIG. 3 particularly depicts a configuration of the camera 22 of the image pickup apparatus 12. The camera 22 includes an image acquisition section 102, a demosaic section 104, a size adjustment section 108, and a pyramid filter section 135. The image acquisition section 102 reads out an image picked up by exposure by the image pickup element at a predetermined rate. This image is a RAW image.

The image acquisition section 102 sends, every time exposure of a pixel string for one horizontal row of a RAW image is completed, the images of the pixel string to the demosaic section 104 and the image sending unit 32. In the following description, it is assumed that, where n is a natural number, a RAW image to be acquired by the image acquisition section 102 has a width of nW pixels in the horizontal direction and a height of nH pixels in the vertical or heightwise direction. This is because it is intended to determine an image prior to reduction to be inputted to the pyramid filter section 135 hereinafter described and having a number W of pixels in the horizontal direction and another number H of pixels in the vertical direction as a reference image. Most simply, n may be set to n=1 and the pyramid filter section 135 may be prepared in accordance with the size of a RAW image which depends upon the resolution of the camera.

On the other hand, in the present embodiment, it is made possible for the configuration of the pyramid filter section 135 to be used as it is in whatever manner the resolution of the camera varies due to technological innovations and so forth thereby to enhance the expandability and make it possible to carry out various processes in a similar manner irrespective of the resolution. Accordingly, the natural number n is determined in response to the resolution of a camera to be introduced. Alternatively, a maximum value of n may be determined within a conceivable range, and the capacity and so forth of the buffer memory may be prepared in response to the maximum value of the natural number n. In this instance, the image acquisition section 102 determines an actual value of n from the image pickup element connected thereto and notifies the other blocks of the actual value of n so that the value of n may be reflected on the contents of processing or a range of use of the buffer memory may be determined.

The demosaic section 104 includes a first in first out (FIFO) buffer 105 having a capacity for nW pixels and a simple demosaic processing portion 106. Pixel data for one horizontal line of a RAW image are inputted to and retained by the FIFO buffer 105 until pixel data for next one horizontal line are inputted to the demosaic section 104. When the simple demosaic processing portion 106 receives pixel data for two horizontal lines, it uses the pixel data to execute a demosaic process of completing, for each pixel, color information based on surrounding pixels thereby to create a full color image.

As well known to those skilled in the art, a large number of methods are available for this demosaic process. Here, a simple demosaic process in which only pixels for two horizontal lines are used can be used satisfactorily. As an example, if a pixel with regard to which corresponding YCbCr values are to be calculated only has a G value, an R value of the pixel is calculated as an average of the R values of the left and right neighboring pixels; the G value of the pixel is determined using the G value as it is; and a B value of the pixel is determined using the B value of a pixel positioned at the upper side or lower side of the pixel. Then, the R, G, and B values are used and substituted into a predetermined conversion expression to calculate YCbCr values. Since such a demosaic process is well known in the art, more detailed description is omitted herein. It is to be noted that the color space of image data produced by processing of the demosaic section 104 and a succeeding block is not limited to the YCbCr space.

The reason why a simple demosaic process can be used satisfactorily is that, where an image of high quality may be required, the RAW image can be used. As a modification to the simple demosaic process, a method of configuring YCbCr values of one pixel from four RGB pixels may be used. In this case, since a demosaic image having a 1/4 size of the RAW image is obtained, a first filter 137 of the pyramid filter section 135 hereinafter described can be eliminated.

The simple demosaic processing portion 106 converts, for example, four RGB pixels of 2×2 into YCbCr color signals for four pixels as depicted in FIG. 3 and transmits the YCbCr color signals to the image sending unit 32 and the size adjustment section 108. The simple demosaic processing portion 106 repeats this process for the entire RAW image inputted thereto to produce a demosaic image having widths of nW pixels in the horizontal direction and nH pixels in the vertical direction with respect to the one RAW image. This image has a size obtained when an image as a reference having W pixels in the horizontal direction and H pixels in the vertical direction is multiplied by n in both of the horizontal and vertical directions. Therefore, the image is hereinafter referred to as $n^2/1$ demosaic image.

The size adjustment section 108 reduces a RAW image acquired by the image acquisition section 102 and an $n^2/1$ demosaic image produced by the demosaic section 104 to 1/n time in both of the horizontal and vertical directions to produce images of the reference image size. To this end, the size adjustment section 108 includes FIFO buffers 112 and 114 having a capacity for nW pixels and a reduction processing portion 110. The FIFO buffer 112 is configured from one or a plurality of FIFO buffers each for retaining pixel data for one horizontal line of a RAW image. The FIFO buffers have a role of retaining, until after pixel data of the last row from among a predetermined number of rows necessary for a single time reduction process are inputted thereto from the image acquisition section 102, pixel data of some other row or rows.

The reduction processing portion 110 uses, at a point of time at which pixel data of the RAW image for the predetermined number of rows are inputted thereto from the image acquisition section 102, the inputted pixel data to carry out a reduction process. A generally used method such as bilinearly interpolation can be used for the reduction process. The number of FIFO buffers which configure the FIFO buffer 112 is determined in accordance with an applied method for the reduction process. For example, where an average value of pixel values for each of a block of n×n pixels is used as one pixel value, in order to produce one row of a reduced image, pixel data for n rows may be required. Therefore, the required number of FIFO buffers is n−1. While, in the example of FIG. 3, more than two FIFO buffers are depicted, only one FIFO buffer may be used for reduction to 1/2 time.

Also the FIFO buffer 114 is configured similarly from one or a plurality of FIFO buffers for individually retaining pixel data for one horizontal line of an $n^2/1$ demosaic image individually corresponding to Y, Cb, and Cr signals. The reduction processing portion 110 uses, at a point of time at which pixel data of an $n^2/1$ demosaic image for the predetermined number of rows are inputted thereto from the demosaic section 104, the inputted pixel data to carry out a reduction process similar to that described hereinabove. As a result of the reduction process, the reduction processing portion 110 outputs pixel data of the reduced RAW image and the Y, Cb, and Cr images after the reduction, which have the widths of W pixels in the horizontal direction and H pixels in the vertical direction, for each one row.

The size adjustment section 108 successively transmits the data to the image sending unit 32 and transmits the data of the Y, Cb, and Cr images also to the pyramid filter section 135. Since the Y, Cb, and Cr images at this time have the reference size, each of them is hereinafter referred to as 1/1 demosaic image. It is to be noted that, where n=1 is satisfied depending upon the resolution of the camera, the reduction process by the size adjustment section 108 may be omitted. The pyramid filter section 135 has a function for hierarchizing a certain image into a plurality of resolutions and outputting resulting images of the resolutions. The pixel data of the Y, Cb, and Cr images of the resolutions produced by the pyramid filter section 135 are transmitted for each one row to the image sending unit 32.

Figure 4:
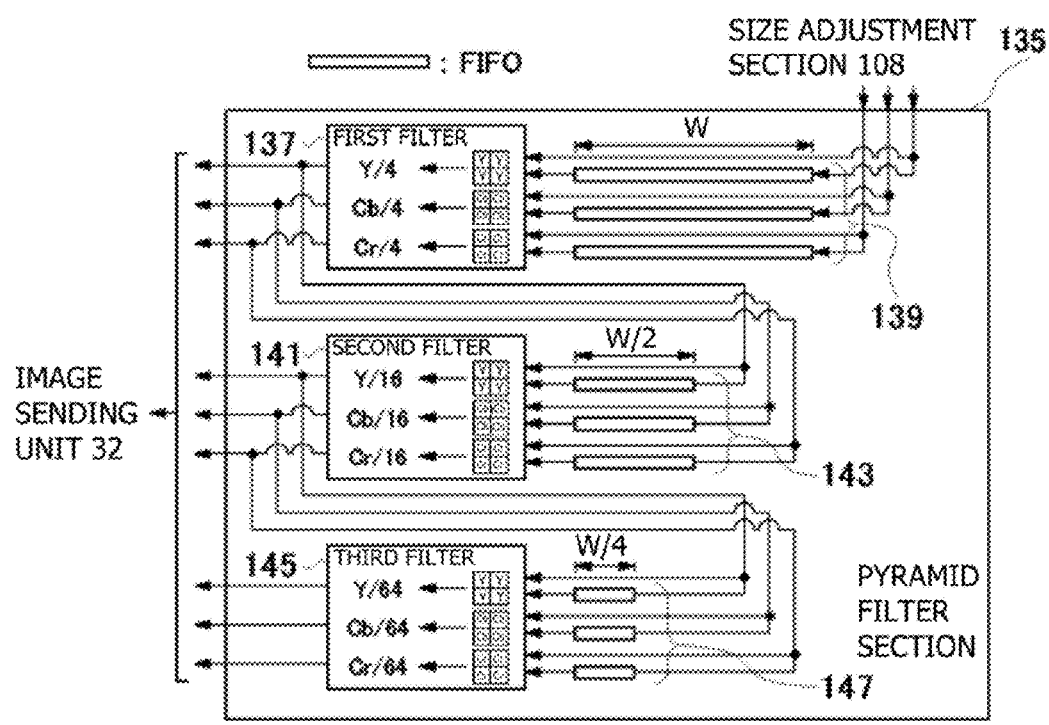
FIG. 4 is a block diagram depicting details of a pyramid filter section depicted in FIG. 3.

FIG. 4 depicts details of the pyramid filter section 135. The pyramid filter section 135 basically includes a number of 1/4 reduction filters corresponding to required resolution levels. In FIG. 4, the pyramid filter section 135 includes filters of three hierarchies including a first filter 137, a second filter 141, and a third filter 145. Each filter executes a process of bilinearly interpolating four pixels neighboring with each other to arithmetically operate an average pixel value of the four pixels. Accordingly, the image size after the process is 1/4 that of the images before the process. It is to be noted that it can be recognized easily by those skilled in the art that the present embodiment can be implemented similarly even if the number of filters is other than filters of three hierarchies.

At the preceding stage to the first filter 137, a FIFO buffer 139 for W pixels is disposed corresponding to each of the Y, Cb, and Cr signals. The FIFO buffers 139 have a role of retaining YCbCr pixel data for one horizontal line until pixel data for a next horizontal line are inputted thereto from the size adjustment section 108. After pixel data for two horizontal lines are inputted, the first filter 137 averages the Y, Cb, and Cr pixel values for four pixels of 2×2. By repeating this sequence of processes, the 1/1 demosaic image having a length reduced to 1/2 in both of the horizontal and vertical directions is obtained. As a result, the size is converted into 1/4 as a whole. The 1/4 demosaic image obtained by the conversion is sent to the image sending unit 32 and passed to the second filter 141 at the succeeding stage.

At the preceding stage to the second filter 141, one FIFO buffer 143 for W/2 pixels is disposed corresponding to each of the Y, Cb, and Cr signals. Also the FIFO buffers 143 have a role of retaining YCbCr pixel data for one horizontal line until pixel data for a next horizontal line are inputted thereto from the first filter 137. After pixel data for two horizontal lines are inputted, the second filter 141 averages the Y, Cb, and Cr pixel values for four pixels of 2×2. By repeating this sequence of processes, a 1/4 demosaic image having a length reduced to 1/2 in both of the horizontal and vertical directions is obtained. As a result, the size is converted into 1/16 as a whole. The 1/16 demosaic image obtained by the conversion is sent to the image sending unit 32 and passed to the third filter 145 at the succeeding stage.

Also the third filter 145 repeats a sequence of processes similar to that described above although a FIFO buffer 147 for W/4 pixels is disposed at the preceding stage thereto. The third filter 145 outputs 1/64 demosaic images to the image sending unit 32. In this manner, image data successively reduced by 1/4 are inputted from the filters of the pyramid filter section 135 to the image sending unit 32. It is to be noted that such a pyramid filter as described above is disclosed in European Patent Application Publication No. 0999518 and therefore is known, and therefore, more detailed description of the pyramid filter section is omitted herein.

It is to be noted that, in the example depicted in FIG. 3, the camera 22 generates, as a plurality of kinds of images, a RAW image of the highest resolution which reflects a configuration of the image pickup element, a reduced RAW image having a reference resolution reduced from the highest resolution of the RAW image and a plurality of demosaic images of different lower resolutions. However, the camera 22 may reduce a RAW image of the highest resolution to those of a plurality of different resolutions without performing a demosaic process and transmit the images of the resolutions to the host terminal 20 such that the host terminal 20 performs a demosaic process of the RAW images of the resolutions. In this case, although the demosaic section 104 can be omitted from the image pickup apparatus 12, the image pickup apparatus 12 may have the same configuration except this.

Figure 5:
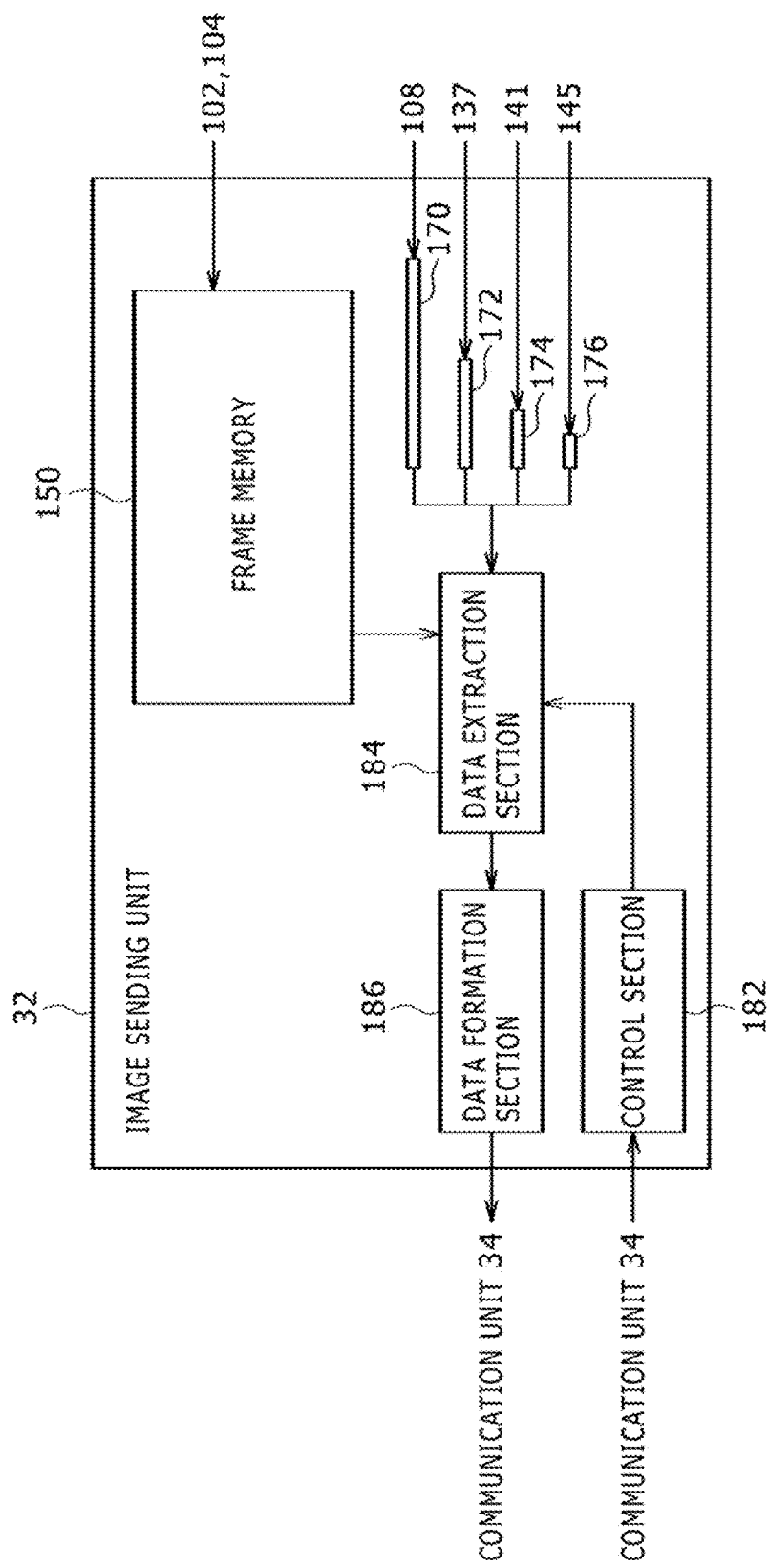
FIG. 5 is a block diagram particularly depicting a configuration of an image sending unit of the image pickup apparatus depicted in FIG. 2.

FIG. 5 particularly depicts a configuration of the image sending unit 32. Referring to FIG. 5, the image sending unit 32 includes a frame memory 150 and FIFO buffers 170, 172, 174, and 176. The frame memory 150 retains data of a RAW image or an $n^2/1$ demosaic image sent thereto from the camera 22 in a unit of a frame. The FIFO buffers 170, 172, 174, and 176 retains a reduced RAW image or 1/1 demosaic image, a 1/4 demosaic image, a 1/16 demosaic image, and a 1/64 demosaic image in a unit of a row, respectively. It is to be noted that, although, in FIGS. 3 and 4, Y, Cb, and Cr data signals are represented individually and arrow marks for inputting lines are indicated for the signals, in FIG. 5 and the succeeding figures, the factors are treated as one set and indicated by one arrow mark in order to simplify illustration.

The image sending unit 32 further includes a control section 182, a data extraction section 184, and a data formation section 186. The control section 182 acquires information relating to image data requested from the host terminal 20 through the communication unit 34, and the data extraction section 184 extracts the requested image data. The data formation section 186 forms transmission data. The frame memory 150 retains data of a RAW image sent thereto from the image acquisition section 102 of the camera 22 or of an $n^2/1$ demosaic image sent thereto from the demosaic section 104 in a unit of a frame.

The FIFO buffer 170 retains pixel values for one horizontal line of a reduced RAW image or a 1/1 demosaic image sent thereto from the size adjustment section 108 of the camera 22. The FIFO buffers 172, 174, and 176 retain pixel values for one horizontal line of a 1/4 demosaic image, a 1/16 demosaic image, and a 1/64 demosaic image sent thereto from the first filter 137, the second filter 141, and the third filter 145 of the camera 22, respectively.

Accordingly, the FIFO buffers 170, 172, 174, and 176 retain W, W/2, W/4, and W/8 pixel values, respectively. It is to be noted that the number of FIFO buffers is determined in accordance with the number of filters in the pyramid filter section 135 of the camera 22. The control section 182 notifies the data extraction section 184 of information relating to image data to be sent out on the basis of a request signal from the host terminal 20. The control section 182 further receives a signal for requesting starting or ending of image pickup, a signal for designating an image pickup condition and so forth from the host terminal 20. Then, the control section 182 provides the information suitably to the image acquisition section 102 of the camera 22 and so forth to process image pickup processing. However, detailed description of the image pickup control is omitted here because a general technology can be applied to the image pickup control.

When the data extraction section 184 acquires information relating to image data requested by the host terminal 20 from the control section 182, it extracts the requested data from image data stored in the FIFO buffers 170, 172, 174, and 176 and the frame memory 150. As described hereinabove, a RAW image, an $n^2/1$ demosaic image, a reduced RAW image, a 1/1 demosaic image, a 1/4 demosaic image, a 1/16 demosaic image, and a 1/64 demosaic image are inputted in the order of production thereof from the camera 22 to the image sending unit 32.

At this time, as the image size decreases, the production frequency in the camera 22, and hence, the inputting frequency to the image sending unit 32, decreases. The data extraction section 184 determines outputting timings taking properties of the images relating to the inputting timing or the frequency into consideration so that, from among the image data inputted in various frequencies in such a manner as described above, the requested data are outputted smoothly with lower delay. In particular, the period in which a reduced RAW image or a 1/1 demosaic image stored in the FIFO buffer 170 for one row is produced is determined as a reference period, and a plurality of kinds of image data requested are outputted cyclically in the period. Details of this are hereinafter described.

The processing performed by the image pickup apparatus 12 in the present embodiment is performed in a raster order in which processing from the left to the right is repeated in the downward direction of the image from a start point at the left upper corner of the image. In order to output a result of such scanning with low delay, inputting from the camera 22 to the image sending unit 32 and transmission from the image pickup apparatus 12 to the host terminal 20 are performed using a form of a stream configured by connecting pixel strings, which configure rows, in order. Accordingly, also data outputted from the data extraction section 184 have a form of a stream of pixel values which include data of various images acquired and/or produced by the camera 22 in a mixed manner therein.

It is to be noted that, in FIG. 5, it is assumed that one of a RAW image which can be inputted from the image acquisition section 102 of the camera 22 and an $n^2/1$ demosaic image which can be inputted from the demosaic section 104 is determined as a transmission object. Further, it is assumed that a reduced RAW image and a 1/1 demosaic image which can be inputted from the size adjustment section 108 of the camera 22 is determined as a transmission object. Therefore, only one input line for each of them is depicted. This is because, in many cases, it is sufficient for display or information processing only if one of a RAW image and an $n^2/1$ demosaic image or one of a reduced RAW image and a 1/1 demosaic image is available.

Which one of images is to be selected may be selectively determined in accordance with a request from the host terminal 20 or may otherwise be fixed. In the former case, such a circuit as a multiplexer may be provided on the output side of the camera or on the input side of the image sending unit 32 such that a control section 182 carries out changeover control of the multiplexer or the like in accordance with a request from the host terminal 20. Alternatively, all data may be retained in a frame memory or a FIFO buffer such that a data extraction section 184 extracts only necessary data. In the following description, it is assumed that principally an $n^2/1$ demosaic image is stored into the frame memory 150 and a 1/1 demosaic image is stored into the FIFO buffer 170.

The data extraction section 184 supplies a data stream of pixel strings in which a plurality of kinds of image data are included in a mixed manner in the order of production to the data formation section 186. The data formation section 186 converts the format of the stream supplied thereto from the data extraction section 184 into a format conforming to a communication protocol with the host terminal 20 so that the stream has a data format with which it can be sent out. Then, the communication unit 34 transmits the steam of the data format to the host terminal 20. For example, the data formation section 186 converts the stream into a packet for each size of an end point of the USB and writes such packets into an internal packet buffer (not depicted). Then, the communication unit 34 successively transfers the packets in the packet buffer to the host terminal 20.

Figure 6:
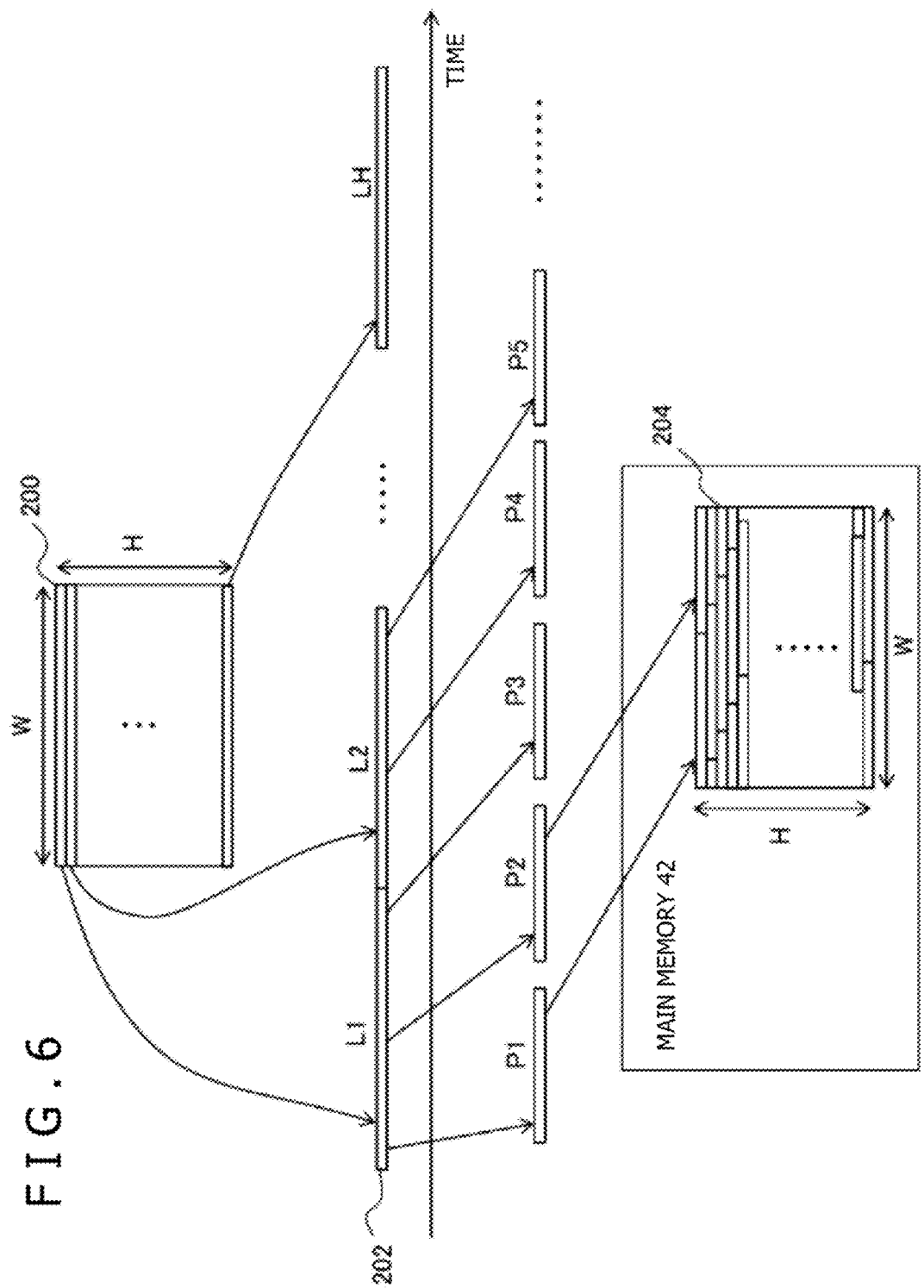
FIG. 6 is a diagrammatic view schematically illustrating a basic transition of the form of data in the image pickup apparatus and the host terminal depicted in FIG. 2.

FIG. 6 schematically illustrates a basic transition of the form of data in the image pickup apparatus 12 and the host terminal 20. Here, as the simplest example, transmission of data of an entire frame image 200 having widths of W pixels in the horizontal direction and H pixels in the vertical direction from the image pickup apparatus 12 to the host terminal 20 is described. As described hereinabove, in the present embodiment, production, extraction, and transmission of image data are carried out in a raster order of pixels, and pixel data in a unit of a row are successively connected to form a stream to be used for processing.

Data outputted from the data extraction section 184 in such a situation as described above correspond to a stream 202. In FIG. 6, the axis of abscissa of the stream 202 represents lapse of time, and rectangles L1, L2, . . . , LH that configure the stream 202 represent data of pixels in the first row, second row, . . . , Hth row of the original frame image 200, respectively. If the data size of one pixel is d bytes, then the data size of each rectangle is W×d bytes.

The data formation section 186 packetizes the stream 202 for each predetermined size to produce packets P1, P2, P3, P4, P5, . . . . Consequently, the data are transmitted in the order of the packets P1, P2, P3, P4, P5, . . . from the image pickup apparatus 12 to the host terminal 20. The host terminal 20 receives the packets P1, P2, P3, P4, P5, . . . through the communication unit 44 and stores the data of the packets into the main memory 42 under the control of the information processing unit 38.

At this time, the host terminal 20 arranges the data of the packets in the raster order so that they have a width corresponding to the pixel number W in the horizontal direction of the original frame image 200 and the data are developed to successive addresses of W×d×H bytes thereby to reproduce an image 204 corresponding to the frame image 200. In FIG. 6, rectangles that configure the image 204 represent the data of the packets. Depending upon the data size of the packets, pixel data included in one packet may span the tale of a row and the head of a next row of the image 204. The image processing unit 40 processes the image 204 developed in the main memory 42 or synthesizes the image 204 with a different image under the control of the information processing unit 38 to produce an image to be displayed on the display apparatus 16.

Figure 7:
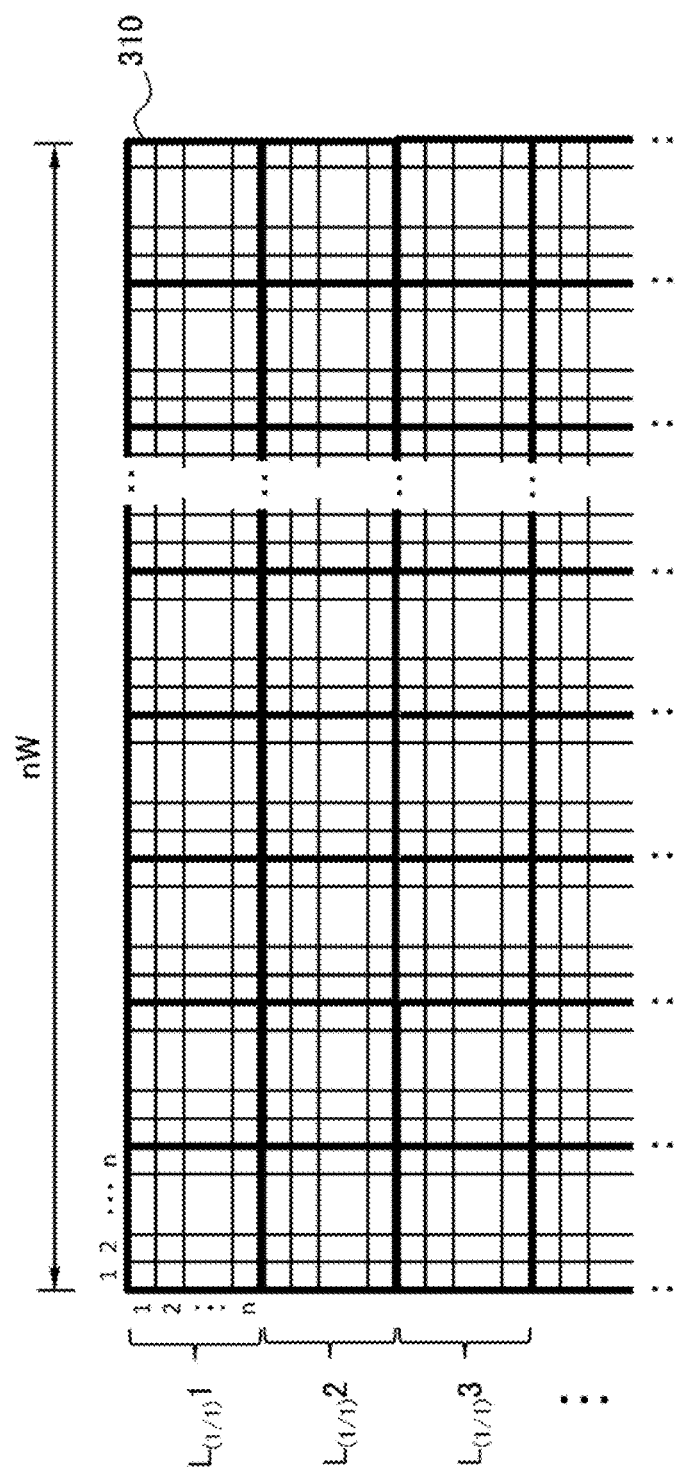
FIG. 7 is a diagrammatic view schematically illustrating a relationship between pixels before and after a reduction process of an image performed by a size adjustment section of a camera depicted in FIG. 2.

FIG. 7 schematically illustrates a relationship between pixels before and after an image reduction process carried out by the size adjustment section 108. An image 310 is a RAW image or an $n^2/1$ demosaic image and has size of nW pixels in the horizontal direction and nH pixels in the vertical direction. A rectangle that is a minimum unit depicted in the inside of the image 310 is a pixel, and row numbers and column numbers from 1 to n are applied to n×n pixels at a left upper corner location of the image. Pixel data of such an image as just described are inputted, in the case of a RAW image, from the image acquisition section 102, but in the case of a demosaic image, from the demosaic section 104, to the size adjustment section 108 for each row.

The size adjustment section 108 retains pixel data of rows inputted previously in the FIFO buffers 112 and 114 until all of pixel data of a predetermined number of rows necessary for a reduction process are inputted completely. If it is tried to produce one pixel after reduction using a block of n×n pixels of the image 310, then at a point of time at which data of the nth row are inputted, the size adjustment section 108 reads out pixel data from the first to n−1th rows retained in the FIFO buffers. Then, the size adjustment section 108 calculates one pixel value by averaging pixel values for each block or by a like method. A rectangle defined by thick lines of the image 310 of FIG. 7 corresponds to one pixel of a reduced RAW image or a 1/1 demosaic image. This sequence of processes is repeated up to the end of the row of the image to produce pixel data for one row of a reduced RAW image or a 1/1 demosaic image having a width of W pixels.

Further, the sequence of processes is repeated in the vertical direction of the image 310 to produce the entirety of a reduced RAW image or a 1/1 demosaic image reduced to 1/n time in both of the horizontal and vertical directions. Every time the size adjustment section 108 produces pixel data for one row, it successively inputs the pixel data to the image sending unit 32 and the pyramid filter section 135. The 1/1 demosaic images produced in this manner are hereinafter denoted by $L_{(1/1)}1$, $L_{(1/1)}2$, $L_{(1/1)}3$, . . . in order beginning with the first row. It is to be noted that a 1/1 demosaic image can be replaced by a reduced RAW image of the same size by later processing as described hereinabove.

Figure 8:
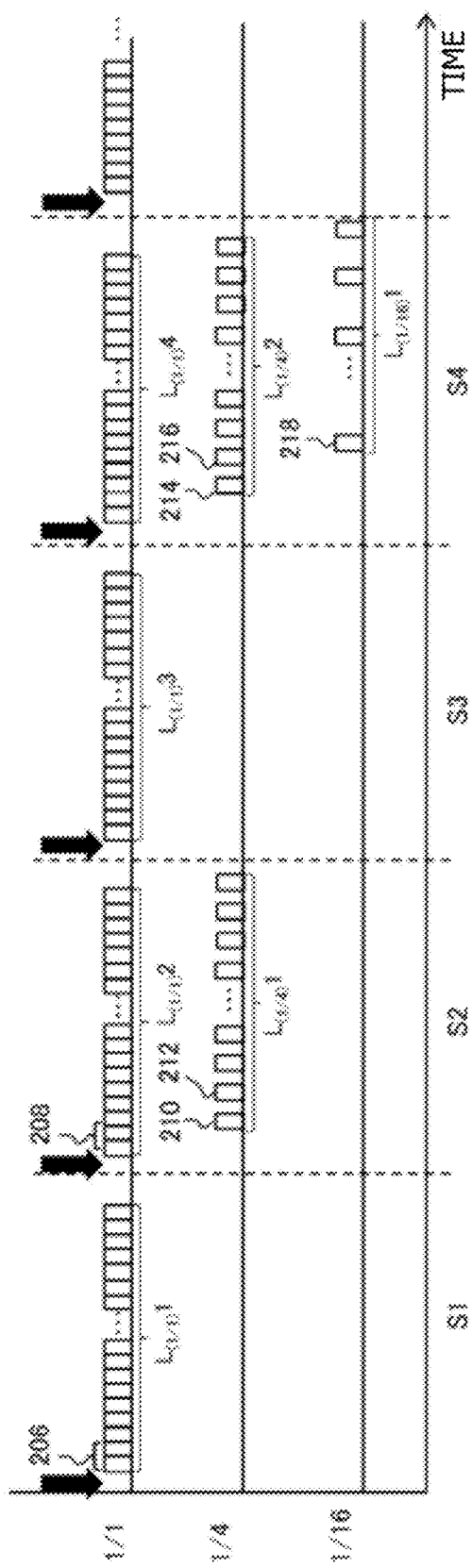
FIG. 8 is a time chart illustrating inputting timings of pixel data of a 1/1 demosaic image, a 1/4 demosaic image, and a 1/16 demosaic image to the image sending unit of FIG. 5.

FIG. 8 is a time chart illustrating timings at which pixel data of a 1/1 demosaic image, a 1/4 demosaic image, and a 1/16 demosaic image are inputted from the filters of the size adjustment section 108 and the pyramid filter section 135 to the image sending unit 32. It is to be noted that, while FIG. 8 depicts reduced images including a 1/16 demosaic image, even if a further reduced demosaic image or images equal to or smaller than a 1/64 are added, similar processing can be applied in principle. In FIG. 8, time steps S1, S2, S3, S4, . . . represent periods within which pixel data of the first row, second row, third row, fourth row, . . . of the 1/1 demosaic image are inputted to the image sending unit 32, respectively.

In the present embodiment, a period within which pixel data for one row of the 1/1 demosaic image are inputted is set as a reference time step as described hereinabove, and within each time step, a plurality of image data requested are connected cyclically and outputted. It is to be noted that, as illustrated in FIG. 7, the size adjustment section 108 begins to produce, simultaneously when pixel data of an $n^2/1$ demosaic image for n−1 rows are stored into the FIFO buffers and then the $n^2/1$ demosaic image for the nth row is inputted, pixel data of a 1/1 demosaic image beginning with the top of the row.

Accordingly, within a period indicated by a thick arrow mark within each time step within which pixel data of each row of a 1/1 demosaic image are inputted, at least pixel data of an $n^2/1$ demosaic image for n−1 rows are inputted to the image sending unit 32, and in FIG. 8, the time axis within the period is shortened. In any case, the time steps S1, S2, S3, S4, . . . correspond also to periods within which pixel data of the $n^2/1$ demosaic image are inputted for n rows. This similarly applies also where a RAW image is selected as input data.

Top, middle, and bottom stages of FIG. 8 indicate input timings of a 1/1 demosaic image, a 1/4 demosaic image, and a 1/16 demosaic image, respectively, and one rectangle corresponds to an input of one pixel. First, within the time step S1, pixel data of the pixel string $L_{(1/1)}1$ of the first line of the 1/1 demosaic image are inputted in order beginning with the pixel at the top of the row. Within this time step, since none of a 1/4 demosaic image and a 1/16 demosaic image is produced as yet, they are not inputted.

Within the next time step S2, pixel data of the pixel string $L_{(1/1)}2$ of the second line of the 1/1 demosaic image are inputted in order beginning with the top of the row. At this time, the pyramid filter section 135 uses the pixel data of the pixel string $L_{(1/1)}1$ of the first line and the pixel string $L_{(1/1)}2$ of the second line of the 1/1 demosaic image to produce a pixel string $L_{(1/4)}1$ of a first line of a 1/4 demosaic image. Therefore, within the time step S2, also the pixel data of the pixel string are inputted.

For example, a pixel value inputted within a period 210 at the left end of the pixel string $L_{(1/4)}1$ of the first line of the 1/4 demosaic image is produced using pixel values of two pixels inputted within a period 206 from within the pixel string $L_{(1/1)}1$ of the first line of the 1/1 demosaic image and pixel values of two pixels within a period 208 from within the pixel string $L_{(1/1)}2$ of the second line. Therefore, within the time step S2, the input timings of the pixel values of the pixel string $L_{(1/4)}1$ are delayed by a period of at least two pixels from the input timings of the pixel values of the corresponding pixels of the pixel string $L_{(1/1)}2$.

Within the next time step S3, pixel data of the pixel string $L_{(1/1)}3$ of the third line of the 1/1 demosaic image are inputted. Within this time step, pixel data for the second line of the 1/4 demosaic image are not produced and a 1/16 demosaic image is not produced as yet, and therefore, none of them is inputted. Within the next time step S4, namely, within a period within which pixel values of the pixel string $L_{(1/1)}4$ of the fourth line of the 1/1 demosaic image are inputted, also pixel data of the pixel string $L_{(1/4)}2$ of the second line of the 1/4 demosaic image are inputted similarly as within the time step S2.

Further, the pyramid filter section 135 uses pixel data of the pixel string $L_{(1/4)}1$ of the first line and the pixel string $L_{(1/4)}2$ of the second line of the 1/4 demosaic image to produce a pixel string $L_{(1/16)}1$ of the first line of a 1/16 demosaic image. Therefore, within the time step S4, also the pixel data of the pixel string are inputted. For example, pixel values inputted within a first input period 218 from within the pixel string $L_{(1/16)}1$ of the first line of the 1/16 demosaic image are produced using pixel values of two pixels inputted within the period 210 and another period 212 from within the pixel string $L_{(1/4)}1$ of the first line of the 1/4 demosaic image and pixel values of two pixels inputted within a period 214 and another period 216 from within the pixel string $L_{(1/4)}2$ of the second line of the 1/4 demosaic image.

Therefore, within the time step S4, the input timings of the pixel string $L_{(1/16)}1$ are delayed by a period of at least two pixels from the input timings of the pixel values of the corresponding pixels of the pixel string $L_{(1/4)}2$. Thereafter, inputting of the pixel data of the images is repeated similarly so that all pixel data of the 1/1 demosaic image, the 1/4 demosaic image, and the 1/16 demosaic image are inputted to the image sending unit 32.

In this manner, the pixel data of the images are inputted in a raster order as individual streams from the blocks of the camera 22 and the filters of the camera 22. The data extraction section 184 connects, from among the images, only the images requested from the host terminal 20 and the data in the requested region of the images to produce a single stream and outputs the stream to the data formation section 186. At this time, if the data of the pixels in the regions are connected in the order of inputting timings irrespective of the kind of the data, then the synthesis process itself is easy. However, when the host terminal 20 thereafter classifies the image data, it is necessary to extract data for each pixel, and this complicates the processing.

Thus, also it seems a possible idea to put pixel data inputted within each time step together for the individual kinds of images to produce pixel strings and connect the pixel strings to each other. In this case, the size of data to be outputted varies in the follow manner depending upon the time step. For example, within the time step S1 or S3, only pixel data of the $n^2/1$ demosaic image and the 1/1 demosaic image are inputted. However, within the time step S4, further pixel data of the 1/4 demosaic image and the 1/16 demosaic image are inputted. Further, the size of data to be outputted varies by a great amount for each time step also depending upon whether or not the data requested from the host terminal 20 include an $n^2/1$ demosaic image or the range of the $n^2/1$ demosaic image.

Therefore, in the present embodiment, with regard to an image which allows a time step within which data is not inputted like a 1/4 demosaic image or a 1/16 demosaic image, the time step is utilized to output part of pixel data inputted immediately prior to the time. Further, a surplus time period which appears by outputting only part of data stored in the FIFO buffer within each time step is utilized to successively output the $n^2/1$ demosaic image stored in the frame memory 150 irrespective of whether or not it is inputted within the time step. By such countermeasures, the sizes of data outputted with different time steps can be generally equalized to each other.

Figure 9:
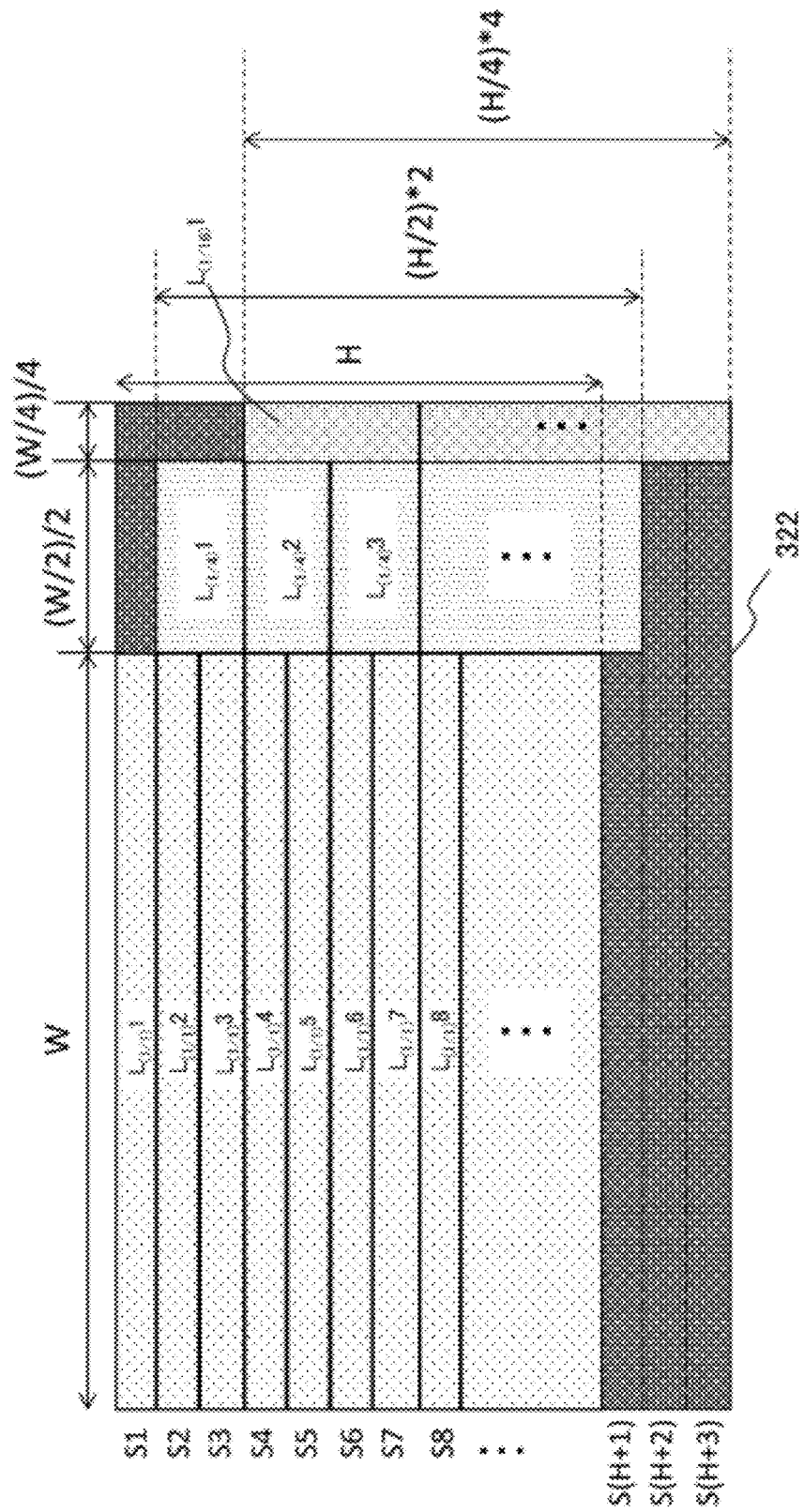
FIG. 9 is a diagrammatic view illustrating a rule applied when a data extraction section depicted in FIG. 5 outputs data stored in a first in first out (FIFO) buffer in a connected relationship to each other.

First, in order to facilitate understandings, a case in which only images stored in the FIFO buffers are made an object of outputting is described. FIG. 9 is a view illustrating a rule when the data extraction section 184 connects and outputs data stored in the FIFO buffers. FIG. 9 depicts, as the most basic example, a case in which the entire regions for a 1/1 demosaic image, a 1/4 demosaic image, and a 1/16 demosaic image are outputted. In FIG. 9, S0, S1, S2, S3, . . . denote the time steps described hereinabove with reference to FIG. 8, and pixel data for one row of a 1/1 demosaic image are inputted to the FIFO buffer 170 within each time step.

In FIG. 9, a pixel string outputted from the data extraction section 184 within each time step is indicated by a dotted rectangle which is different among different kinds of images. As described hereinabove with reference to FIG. 8, within the time step S1, only pixel data of the pixel string $L_{(1/1)}1$ of the first line of the 1/1 demosaic image are stored into the FIFO buffer 170. The data extraction section 184 reads out and outputs the stored pixel data. It is to be noted that each row of the 1/1 demosaic image is configured from W pixels as described hereinabove and as depicted in FIG. 9.

Within the next time step S2, pixel data of the pixel string $L_{(1/1)}2$ of the second line of the 1/1 demosaic image and pixel data of the pixel string $L_{(1/4)}1$ of the first line of the 1/4 demosaic image are stored in parallel into the FIFO buffers 170 and 172 at such a timing as illustrated in FIG. 8. The data extraction section 184 first reads out the pixel data of the pixel string $L_{(1/1)}2$ of the second line of the 1/1 demosaic image from the FIFO buffer 170 and outputs the read out pixel data.

After all of the pixel values of the pixel string $L_{(1/1)}2$ of the second line of the 1/1 demosaic image are outputted, the data extraction section 184 reads out the pixel string $L_{(1/4)}1$ of the first line of the 1/4 demosaic image from the FIFO buffer 172 and outputs the read out data. At this time, taking an amount of data to be outputted within the succeeding time step S3 into consideration, pixel data of only those pixels in a front half portion from among all pixels of the pixel string $L_{(1/4)}1$ of the first line of the 1/4 demosaic image (those pixels in a left half of the image plane) are outputted while the remaining data are continuously retained in the FIFO buffer 172.

Within the next time step S3, only pixel data of the pixel string $L_{(1/1)}3$ of the third line of the 1/1 demosaic image are inputted to the FIFO buffer 170. Therefore, the data extraction section 184 first reads out and outputs the pixel data. Then, the data extraction section 184 reads out those pixel data in the latter half (right half of the image plane) of the pixel string $L_{(1/4)}1$ of the first line of the 1/4 demosaic image which have not been outputted as yet from the FIFO buffer 172 and outputs the read out pixel data.

Within the next time step S4, pixel data of the pixel string $L_{(1/1)}4$ of the fourth line of the 1/1 demosaic image and pixel data of the pixel string $L_{(1/4)}2$ of the second line of the 1/4 demosaic image and the pixel string $L_{(1/16)}1$ of the first line of the 1/16 demosaic image are inputted in parallel to the FIFO buffers 170, 172, and 174 at such a timing as illustrated in FIG. 8. The data extraction section 184 first reads out the pixel data of the pixel string $L_{(1/1)}4$ of the fourth line of the 1/1 demosaic image from the FIFO buffer 170 and outputs the read out pixel data.

After all of the pixel data of the pixel string $L_{(1/1)}4$ of the fourth line of the 1/1 demosaic image are outputted, the data extraction section 184 reads out a former half of the pixel string $L_{(1/4)}2$ of the second line of the 1/4 demosaic image from the FIFO buffer 172 and outputs the read out data. Then, the pixel string $L_{(1/16)}1$ of the first line of the 1/16 demosaic image is read out from the FIFO buffer 174 and outputted. At this time, taking an amount of data to be outputted within the three succeeding time steps S5, S6, and S7 into consideration, the pixel string $L_{(1/16)}1$ of the first line of the 1/16 demosaic image is divided into four, and only pixel data of the first division are outputted. The data of the remaining divisions are stored into the FIFO buffer 174.

Within the next time step S5, only pixel data of the pixel string $L_{(1/1)}5$ of the fifth line of the 1/1 demosaic image are inputted to the FIFO buffer 170. Therefore, the data extraction section 184 first reads out and outputs the pixel data. Then, the data extraction section 184 reads out the pixel data of the latter half of the pixel string $L_{(1/4)}2$ of the second line of the 1/4 demosaic image which have not been outputted as yet from the FIFO buffer 172 and outputs the read out pixel data. Further, the data extraction section 184 outputs the pixel data of the second one of the four divisions of the pixel string $L_{(1/16)}1$ of the first line of the 1/16 demosaic image which have not been outputted as yet.

Similarly, within the next time step S6, the data extraction section 184 outputs pixel data of the pixel string $L_{(1/1)}6$ of the sixth line of the 1/1 demosaic image, pixel data of the former half of the pixel string $L_{(1/4)}3$ of the third line of the 1/4 demosaic image, and pixel data of the third one of the four divisions of the pixel string $L_{(1/16)}1$ of the first line of the 1/16 demosaic image which have not been outputted as yet. Within the next time step S7, the data extraction section 184 outputs pixel data of the pixel string $L_{(1/1)}7$ of the seventh line of the 1/1 demosaic image, pixel data of the latter half of the pixel string $L_{(1/4)}3$ of the third line of the 1/4 demosaic image, and pixel data of the last one of the four divisions of the pixel string $L_{(1/16)}1$ of the first line of the 1/16 demosaic image.

In particular, the pixel string $L_{(1/4)}1$ of the first line of the 1/4 demosaic image is outputted half by half within two time steps including the time steps S2 and S3. The pixel string $L_{(1/16)}1$ of the first line of the 1/16 demosaic image is outputted by one fourth within the four time steps S4, S5, S6, and S7. Where the pixel number of the 1/1 demosaic image in the horizontal direction is W, since the pixel number for one row of the 1/4 demosaic image and the 1/16 demosaic image is W/2 and W/4, respectively, data of (W/2)/2 and (W/4)/4 pixels are outputted per time step as depicted in FIG. 9.

The outputting sequence of processes described above is repeated down to the lowermost row of the image. At this time, at a point of time at which pixel data of the lowermost row of the 1/1 demosaic image are outputted, the pixel data of the latter half of the lowermost row of the 1/4 demosaic image and the pixel data of the remaining three fourths of the lowermost row of the 1/16 demosaic image are not outputted as yet. The data extraction section 184 continues outputting of pixel data until it completes outputting of the data which have not been outputted as yet. In particular, within a time step S(H+1) immediately after outputting of all rows of the 1/1 demosaic image is completed, the pixel data of the latter half of the lowermost row of the 1/4 demosaic image and the pixel data of the second one of the four divisions of the lowermost row of the 1/16 demosaic image are outputted.

At this time, as data for the W pixels having been outputted as data of the 1/1 demosaic image, invalid data are outputted first. Following the invalid data, data of the 1/4 demosaic image and the 1/16 demosaic image are outputted. Within the succeeding two time steps S(H+2) and S(H+3), as data for W+(W/2)/2 pixels having been outputted as data of the 1/1 demosaic image and the 1/4 demosaic image, invalid data are outputted first. Following the invalid data, pixel data of the third and fourth ones of the four divisions of the lowermost row of the 1/16 demosaic image are outputted.

If such an outputting process as described above is applied, then data of W+(W/2)/2+(W/4)/4=21W/16 pixels are outputted within all the time steps except the first three time steps and the last three time steps. Further, in order to output pixel data for one row, the 1/1 demosaic image requires one time step; the 1/4 demosaic image requires two time steps; and the 1/16 demosaic image requires four time steps. Therefore, the number of time steps required to output image data for one frame is given by H=(H/2)×2=(H/4)×4 and is equal with regard to all of the images. The total time step number required to output data for one frame of the three kinds of images is given as H+3.

The data outputted from the data extraction section 184 are an enumeration of pixel data as described hereinabove. However, in two-dimensional data 322 which are image data to be outputted within individual time steps are juxtaposed in a vertical direction as depicted in FIG. 9, data of a plurality of kinds of images configure rectangular regions. Within each time step, the two-dimensional data 322 are transmitted one by one row, and succeeding processes for the two-dimensional data 322 are equivalent to those for the frame image 200 as depicted in FIG. 6. If this is taken into consideration, then the data extraction section 184 produces an image substantially like an image formed from two-dimensional data 322. This virtual two-dimensional data is hereinafter referred to as "synthesis image." If the locality of data of various images in the synthesis image 322 is utilized, then it is facilitated for the host terminal 20 to separate data for each kind of an image.

As described hereinabove with reference to FIG. 9, if pixel strings stored in the FIFO buffers are connected to each other in accordance with rules corresponding to the kinds of images and outputting the resulting pixel string as immediately as possible, then the configuration of the buffers can be minimized and simultaneously the latency after image pickup till data transmission can be reduced to the minimum. However, in the example of FIG. 9, it is presupposed that the entire regions for a 1/1 demosaic image, a 1/4 demosaic image, and a 1/16 demosaic image are included into a synthesis image.

Figure 10:
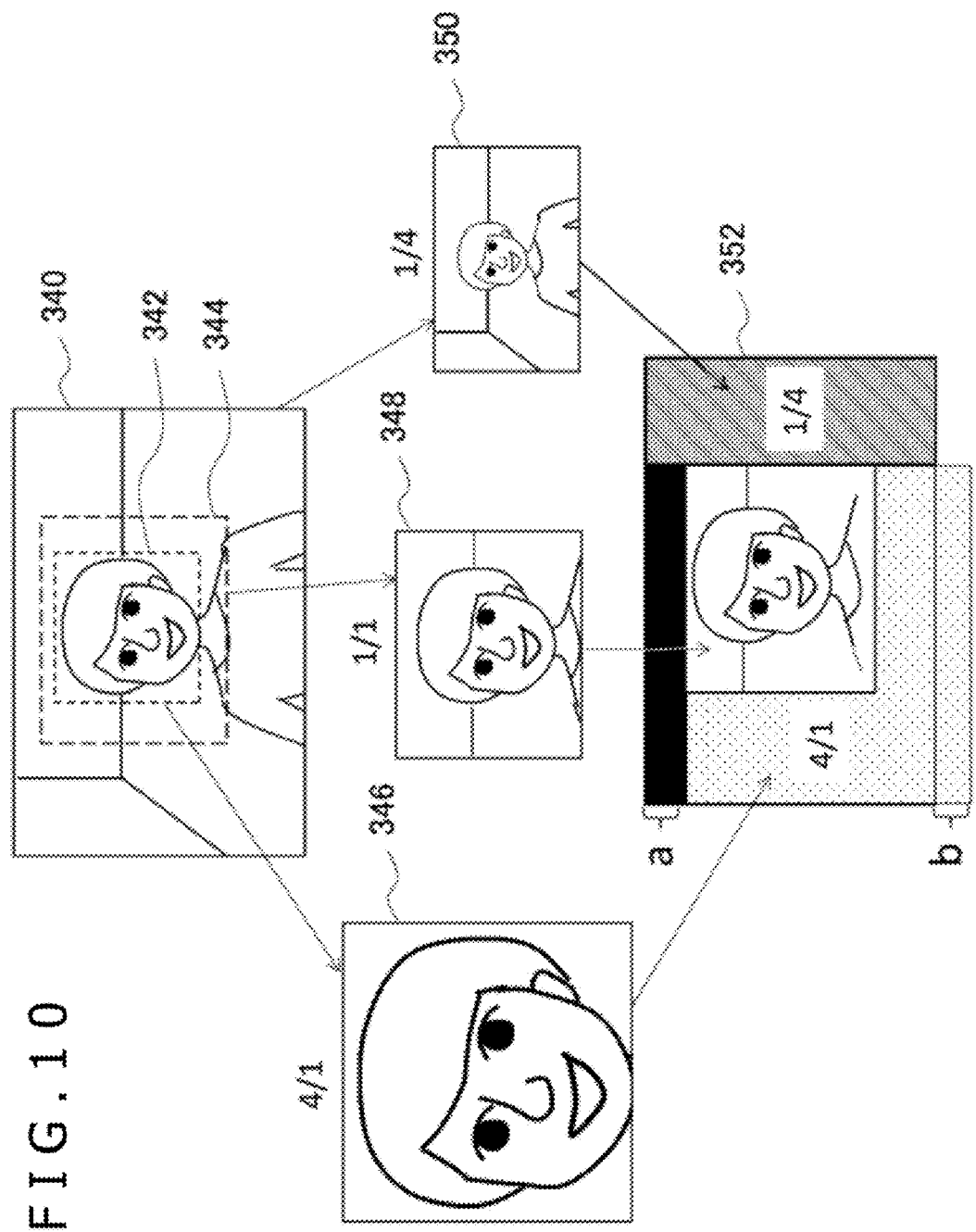
FIG. 10 is a view schematically depicting a manner in which the data extraction section mixes data stored in a frame memory and data stored in the FIFO buffer to produce a synthesis image.

On the other hand, in the present embodiment, it is permitted to transmit only a region requested from the host terminal 20 and data of an $n^2/1$ demosaic image is incorporated into a free space in the synthesis image produced in this manner. FIG. 10 schematically illustrates a manner in which the data extraction section 184 produces a synthesis image such that data stored in the frame memory 150 and data stored in the FIFO buffers are mixed. It is to be noted that, in the following description, in order to avoid complication of description, it is assumed that a 4/1 demosaic image is applied as the $n^2/1$ demosaic image and this 4/1 demosaic image, a 1/1 demosaic image, and a 1/4 demosaic image are determined as an object of outputting. However, it is not intended to restrict the present technology to the configuration just described.

First, the upper stage of FIG. 10 represents a picked up image 340 in a size of a 1/1 demosaic image of a reference size. From the camera 22, a 4/1 demosaic image having a size four times the reference size is inputted to the frame memory 150 and a 1/1 demosaic image of the reference size is inputted to the FIFO buffer 170 while a 1/4 demosaic image having a size 1/4 time the reference size is input to the FIFO buffer 172. Along with this, pixel values are inputted in the order in which they are produced.

Here, it is assumed that a request for a 4/1 demosaic image 346 in a region 342 of the face of a person who is an image pickup object, a 1/1 demosaic image 348 in a region 344 including a region surrounding the region 342, and a 1/4 demosaic image 350 of the entire picked up image 340 is issued from the host terminal 20. In this case, since there is no necessity to output the region of the 1/1 demosaic image other than the requested region 344, the input data for the region is discarded. Then, within each time step, data for one row in the region 344 of the 1/1 demosaic image and data for one half row of the 1/4 demosaic image are connected and outputted.

As a result, within each time step, a surplus time period appears other than a time period within which necessary data are to be outputted. Therefore, the surplus time period is utilized to output data of the 4/1 demosaic image. In particular, in the synthesis image 352, the region of the 1/1 demosaic image is disposed so as to be contiguous to the region of the 1/4 demosaic image, and the left side and the lower side are determined as a region for the 4/1 demosaic image 346. If the data are grasped as a stream to be outputted, then within a time step within which the data of the 1/1 demosaic image to be outputted exist, data of the 4/1 demosaic image 346, data of the 1/1 demosaic image 348, and data of the 1/4 demosaic image 350 are cyclically connected in this order and outputted. Within a time step within which the 1/1 demosaic image to be outputted do not exist, data of the 4/1 demosaic image 346 and the data of the 1/4 demosaic image 350 are connected and outputted.

In short, while, in regard to the 1/1 demosaic image and the 1/4 demosaic image, data of each row are outputted at a substantially same timing within a time step within which the data are produced or within a next time step as a rule, no such constraint condition is provided for outputting of data of the 4/1 demosaic image. Consequently, the image pickup timing of the camera can be utilized without waste to output data and optimize the output data size in each time step.

It is to be noted that, at a stage at which data of a row of a picked up image at a location higher than the region 342 requested as the 4/1 demosaic image, data of the 4/1 demosaic image 346 for the region 342 are not produced as yet, and therefore, there exists not data to be outputted. Accordingly, a region of the synthesis image 352 of FIG. 10 which corresponds to the period a is represented as a blackened invalid region. However, if the period is considered in successive image frames, then it can be utilized for outputting of data of the 4/1 demosaic image of the preceding image frame.

In short, even if production of the last row of the picked up image is completed and production of a next image frame is started, the 4/1 demosaic image continues to be outputted for a predetermined period of time. If this period b is set equal to the period a within which data are not produced as yet and data of a 4/1 demosaic image cannot be outputted, then it is possible to continue to output data without waste within all periods within which successive frames are imaged.

At this time, the data size of the 4/1 demosaic image which can be transmitted per one frame corresponds to the area of an L-shaped region of the synthesis image 352 which is occupied by the image. The size of the synthesis image 352 is determined in response to the image pickup rate of the camera and the transmission bandwidth permitted in communication with the host terminal 20. By suitably distributing the area of the region of each image in the synthesis image on the basis of a result of determination, the size of the region of each image which can be requested by the host terminal 20 is determined.

Here, a mode of the display apparatus 16 is imagined in which the display apparatus 16 formed as a head-mounted display unit including the image pickup apparatus 12 and a picked up image is displayed immediately in such a manner that a user who wears the head-mounted display unit views the real world through a displayed image. In order to implement such a situation as just described without an uncomfortable feeling, it is demanded to display the picked up image in such a manner as to follow up any motion of the user. To this end, it is preferable to raise the frame rate of image pickup and picked up image outputting as high as possible.

However, even if the frame rate, for example, of the image pickup apparatus 12 and the display apparatus 16 can be raised to twice, if the transmission bandwidth from the image pickup apparatus 12 to the display apparatus 16 cannot be raised qualitatively to twice, delay or missing of frames occurs before display. As described above, since, in the present embodiment, a plurality of kinds of images representative of one frame are combined in the synthesis image 352 and transmitted, it is possible to change the combination or adjust the transmission mode of images of each kind independently. Utilizing this characteristic, by maintaining the low delaying property as described above and further pursuing the efficiency upon transmission, an image which changes equivalently to a change of the actual field of view can be displayed even if the required transmission bandwidth is expanded by a great amount.

In particular, in regard to image data of the highest resolution for which the temporal constraint condition is loose, only every other frame by a predetermined number N (N is a natural number) from among all frames acquired at an image pickup frame rate are determined as a transmission target. Further, while image data of any other kind are outputted in an order of generation thereof for every one row or for each of pixel strings formed by dividing one row of the image data, image data of the highest resolution are outputted continuously such that one frame thereof is outputted in a corresponding relationship to N+1 frames of the image data of any other kind. This can reduce the transmission bandwidth to be allocated to image data of the highest resolution.

In particular, considering in regard to the synthesis image 352, the area of a region occupied by data of a 4/1 demosaic image can be reduced to 1/N, and the area of the synthesis image 352 per one frame of a picked up image, and hence, the required total transmission bandwidth, can be suppressed. At this time, the following two outputting orders of an image of the highest resolution are available.

(1) The required region is successively outputted in the raster order from the left upper corner.

(2) Outputting of the requested region in N every other row is repeated by N+1 times while the outputting row is shifted successively.

The outputting order (1) above is effective where priority is given to the concurrency of image transmission and display although the frame rate decreases to a 1/(N+1) time that of images of the other kinds. The outputting order (2) is effective where priority is given to the low delaying property since, although data are outputted in N every other row, the frame rate is equal to that of images of the other kinds. The two outputting orders may be used properly in response to an information processing to be performed or to the substance of an image to be displayed, or may be changed over midway in accordance with a situation. Even with this, data at least of a 1/4 demosaic image representative of the entire image continue to be transmitted at a high frame rate, and therefore, especially with a display mode of such a head-mounted display unit as described above, the immediacy of display with respect to a variation of the field of view is not lost.

Further, in regard to a significant place like the face of the opposite party in the field of view, the level of detail can be ensured with a 1/1 demosaic image transmitted with low latency or a 4/1 demosaic image transmitted in a unique mode as described above. Therefore, it is possible to perform image processing such as face recognition or visual tracking with a high degree of accuracy or to display an image of high quality sufficient to withstand the gaze. The extraction process of a frame of a transmission target from among image data of the highest resolution may be carried out by controlling a switch or the like provided on the preceding stage upon data storage into the frame memory 150 of the image sending unit 32 or may be performed by the data extraction section 184.

Figure 11:
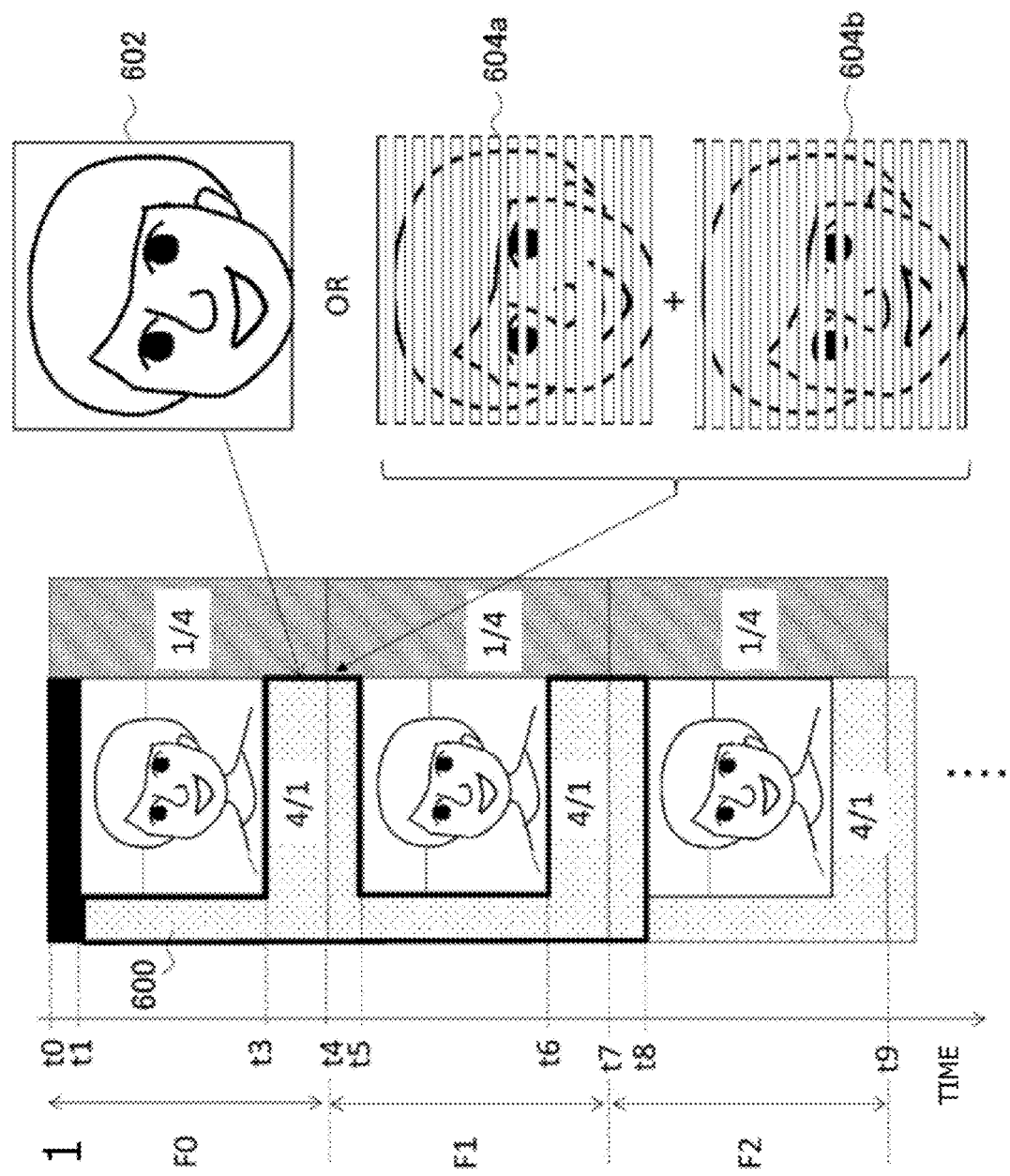
FIG. 11 is a view schematically depicting a configuration of data of a plurality of frames outputted from the image pickup apparatus in a mode in which a 4/1 demosaic image is outputted N=1 every other row from the image pickup apparatus.

FIG. 11 schematically depicts a configuration of data of a plurality of frames outputted from the image pickup apparatus 12 in the mode in which a 4/1 demosaic image is outputted in N=1 every other row. The axis of ordinate indicates passage of time, and configurations of a pixel string outputted at different time steps are indicated in the horizontal direction. Time t0, t4, t6, t7, and t9 correspond to timings of vertical synchronization, and it is assumed that data of successive image frames F0, F1, and F2 are generated between the timings.

With respect to such time change, data in a requested region from within a 1/1 demosaic image and data in the overall region of a 1/4 demosaic image are outputted at a substantially same timing as that of generation thereof similarly to those described hereinabove with reference to FIG. 10. In particular, the data of the image frames F0, F1, and F2 are outputted for each row or for each one half row within the time ranges of the time points t0 to t4, t4 to t7, and t7 to t9, respectively. On the other hand, as regards a 4/1 demosaic image, data in a requested region of the image frame F0 are outputted within a period, for example, corresponding to the image frames F0 and F1.

In particular, data of an image 602 or images 604a and 604b in a requested region of the image frame F0 are outputted at a timing and with a pixel number corresponding to a region 600 surrounded by a thick line frame. Here, the image 602 indicates that it is outputted in the raster order over the region 600 as described hereinabove in the description of the outputting order (1). The images 604a and 604b are indicated that data of odd-numbered rows (image 604a) are outputted in the former half of the region 600 and data of even-numbered rows (image 604b) are outputted in the latter half of the region 600 as described hereinabove in the description of the outputting order (2). Within a period corresponding to the succeeding image frames F2 and F3 (not depicted), data in a requested region of the image frame F2 are outputted similarly.

More particularly, in the case of the image frame F0 immediately after image pickup is started, since a 4/1 demosaic image and a 1/1 demosaic image to be outputted do not exist within the period from time t0 to time t1, invalid data and a 1/4 demosaic image are outputted as described with reference to FIG. 10. If data generation reaches the requested region of the 1/1 demosaic image at time t1, then outputting of the 1/1 demosaic image is started. Immediately after then, the data generation reaches the requested region of the 4/1 demosaic image, and therefore, outputting also of the 4/1 demosaic image is started. Before time t3 at which data outputting of the request region of the 1/1 demosaic image is completed, the 4/1 demosaic image, the 1/1 demosaic image, and the 1/4 demosaic image are outputted cyclically.

It is to be noted that the time at which outputting of the 4/1 demosaic image can be started is, in FIG. 11, substantially same as time t1 although strictly it depends upon the positional relationship with the requested region of the 1/1 demosaic image. After time t3, the 4/1 demosaic image and the 1/4 demosaic image are outputted in a connected relationship to each other. After the outputting of the last row of the 1/4 demosaic image is completed at time t4, the outputting of the 4/1 demosaic image is continued. In the meantime, since data generation of the next image frame F1 is started at time t4, outputting of the 1/4 demosaic image of the image frame F1 is started. As a result, data of the 4/1 demosaic image of the image frame F0 and the 1/4 demosaic image of the image frame F1 are outputted in a connected relationship to each other.

Then, if the data generation reaches the requested region of the 1/1 demosaic image of the image frame F1 at time t5, then the 4/1 demosaic image of the image frame F0, the 1/1 demosaic image of the image frame F1, and the 1/4 demosaic image of the image frame F1 are outputted cyclically. If the data outputting of the requested region of the 1/1 demosaic image is completed, then data of the 4/1 demosaic image of the image frame F0 and the 1/4 demosaic image of the image frame F1 are outputted in a connected relationship to each other again.

Since data generation of the next image frame F2 is started at time t7, the 4/1 demosaic image of the image frame F0 and the 1/4 demosaic image of the image frame F2 are outputted in a connected relationship to each other. If the number of pixels with which invalid data are outputted within the time period from time t0 to time t1 (the area of a synthesis image) and the number of pixels of the 4/1 demosaic image outputted within the time period from time t7 to time t8 are equal to each other, then at the outputting starting time point of the 4/1 demosaic image of the image frame F2, in FIG. 11, at time substantially same as the outputting starting time t8 of the 1/1 demosaic image, the data outputting of the 4/1 demosaic image of the image frame F0 comes to an end.

Accordingly, after time t8, data of the images may be outputted by a configuration similar to that after time t1 of the image frame F0. By repeating such a process as described above, while the total amount of data outputted at individual time points may always be fixed, data only of an image of the highest resolution can be outputted continuously after every other frame. Here, the outputting pixel number permitted for the 4/1 demosaic image depends upon the area of the region 600 surrounded by the thick lines in FIG. 11.

Accordingly, if the area of the region 600 is derived in response to the permissible value of the transmission bandwidth, the size of the entire image, the size of the requested region of the 1/1 demosaic image and so forth and the size of the requested region of the 4/1 demosaic image is determined in response to the derived area, then a maximum amount of data can be transmitted using the transmission bandwidth without waste. It is to be noted that in the case of a 4/1 demosaic image is outputted in N=1 every other frame is exemplified, but the value of N is not limited to this. Qualitatively, as value of N is increased, the rate of the frame rate for the transmission bandwidth can increase.

Figure 12:
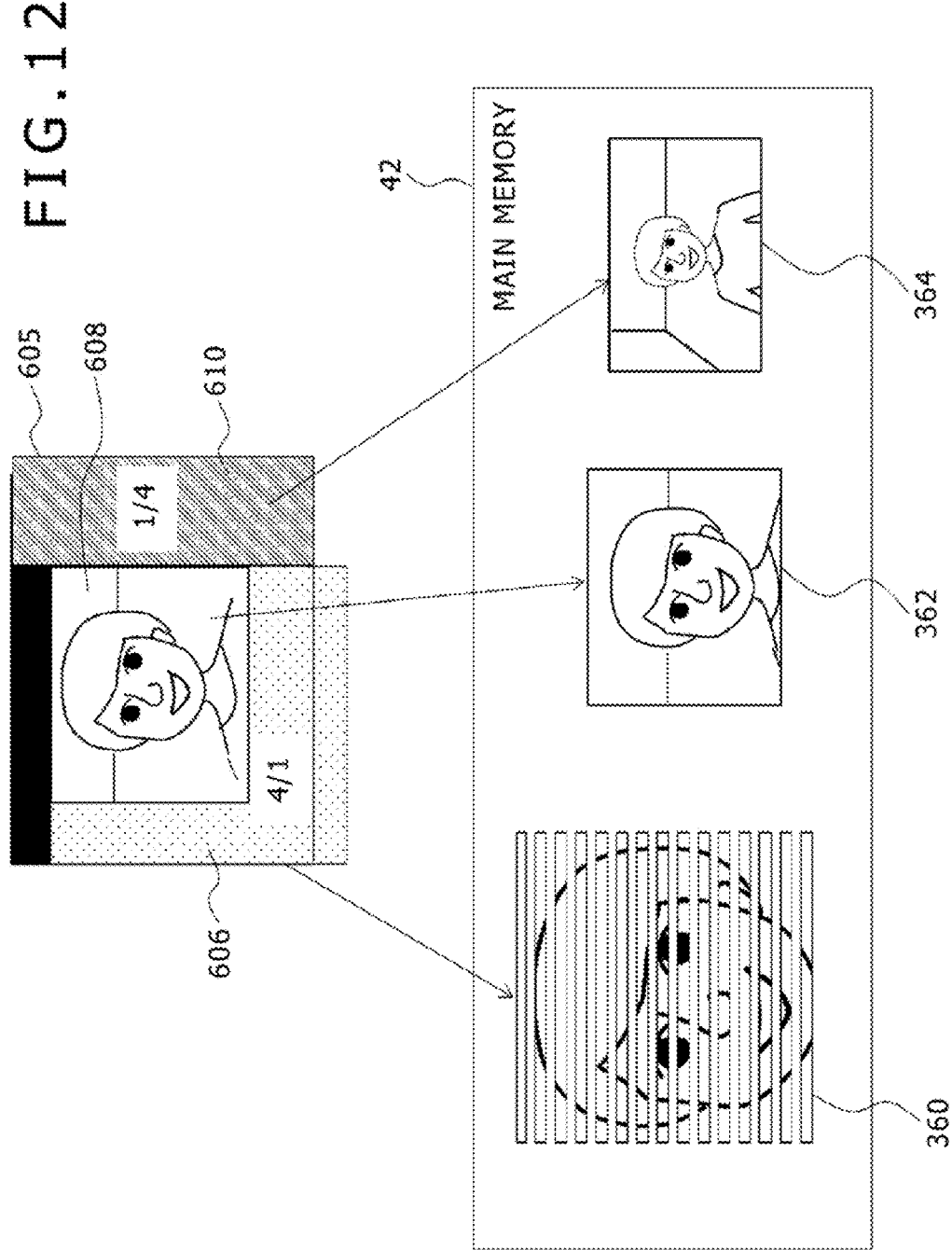
FIG. 12 is a schematic view illustrating a process by the host terminal for image data transmitted from the image pickup apparatus.

FIG. 12 is a view illustrating processing of the host terminal 20 for image data transmitted from the image pickup apparatus 12. The information processing unit 38 of the host terminal 20 cuts the data stream of the synthesis image transmitted thereto into individual images on the basis of the size and the position of the region of each image requested by the host terminal 20 itself and develops the images to successive addresses of the main memory 42. As depicted in FIG. 11, in a synthesis image 605 of one unit corresponding to one frame of the picked up image, data of a plurality of kinds of images are disposed individually in regions 606, 608, and 610.

Of the regions mentioned, the region 606 of the data for a 4/1 demosaic image depends upon the size and the position in the upward and downward direction of the region of the 1/1 demosaic image requested by the host terminal 20 itself. Accordingly, the region 606 is specified on the basis of the information mentioned, and the pixel values in the region are read out in a raster order. Then, by dividing the pixel string in a length in the horizontal direction of the region on the picked up image requested with regard to the 4/1 demosaic image and arranging the divisional strings in a vertical direction, a 4/1 demosaic image 360 can be restored.

However, as described hereinabove, data of the 4/1 demosaic image included in the synthesis image 605 of one unit corresponding to each frame of the picked up image are part of one frame, in particular, 1/(N+1) of one frame. In the example depicted in FIG. 12, a manner is illustrated in which N=1 and only odd-numbered rows or even-numbered rows of the 4/1 demosaic image 360 are developed. Depending upon the transmission mode, an upper half or a lower half of the 4/1 demosaic image is developed. As regards the 1/1 demosaic image and the 1/4 demosaic image, the transmitted data can be restored as images 362 and 364 by reading out the pixels in the raster order from the corresponding regions 608 and 610 of the synthesis image 605, respectively, and arranging the pixels in an original size.

It is to be noted that, since the synthesis image 605 is actually transmitted as a stream, the information processing unit 38 isolates data of a plurality of kinds of images from each other in parallel in the arriving order of the data. Alternatively, the information processing unit 38 may develop the synthesis image 605 as it is into the main memory 42 such that the data are distinguished from each other at a stage at which the data are used for image processing or the like. The information processing unit 38 and the image processing unit 40 further cut out a region to be used for displaying from the isolated images or work the image in accordance with the displaying method of the display apparatus 16. Alternatively, the information processing unit 38 and the image processing unit 40 may render a 3D object on an image in accordance with the progress of a game or may perform image analysis such as face recognition or gesture recognition and then perform corresponding information processing. At this time, if a process for the 4/1 demosaic image is required, then it is performed at a rate lower than that for the images of the other kinds.

Figure 13:
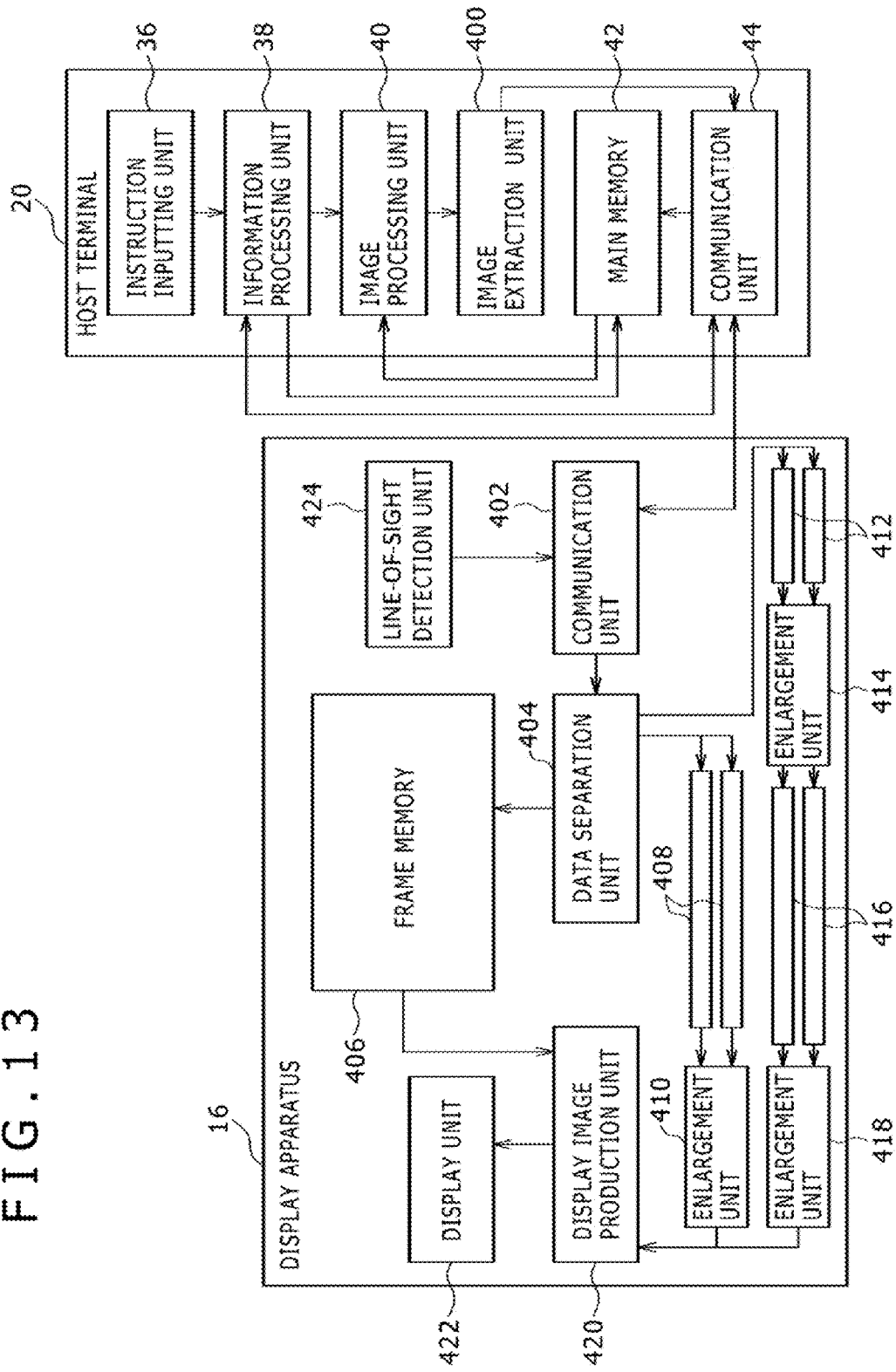
FIG. 13 is a block diagram particularly depicting a configuration of the host terminal and a display apparatus depicted in FIG. 1.

Now, a similar technique is described in regard to a case in which it is applied to transmission of image data from the host terminal 20 to the display apparatus 16. FIG. 13 particularly depicts functions of the host terminal 20 and the display apparatus 16 in this case. It is to be noted that blocks of the host terminal 20 having similar functions to those described hereinabove with reference to FIG. 3 are denoted by like reference characters.

The host terminal 20 includes an instruction inputting unit 36, an information processing unit 38, an image processing unit 40, an image extraction unit 400, a main memory 42, and a communication unit 44. The instruction inputting unit 36 acquires an instruction input from the user. The information processing unit 38 totally controls the host terminal 20 and the display apparatus 16 to carry out information processing in accordance with an object. The image processing unit 40 produces an image to be used for display. The image extraction unit 400 produces image data for transmission. The main memory 42 stores image data from the image pickup apparatus 12. The communication unit 44 is an interface which carries out transmission and reception of image data and necessary information to and from the image pickup apparatus 12 and the display apparatus 16.

The instruction inputting unit 36, the information processing unit 38, the image processing unit 40, the main memory 42, and the communication unit 44 have functions described hereinabove with reference to FIG. 3. It is to be noted that an image produced by the image processing unit 40 may be the image utilizing the picked up image transmitted from the image pickup apparatus 12 or may be produced newly by 3D graphics or the like. Where data of the picked up image from the image pickup apparatus 12 are acquired with a plurality of resolutions, only some processes may be performed for the data. However, where the host terminal 20 is in an environment in which only an image of a single resolution is transmitted from the image pickup apparatus 12 or in which the host terminal 20 itself renders a 3D graphics, the host terminal 20 produces a plurality of kinds of images of different resolutions for each frame. This process may be similar to the reduction process performed by the camera 22.

The image extraction unit 400 produces a stream of a synthesis image configured from a plurality of kinds of images to be displayed on the display apparatus 16. The synthesis image is an image in which a plurality of kinds of image data are disposed in individual regions similarly to that described hereinabove with reference to FIG. 10 and is a virtual image which is produced and outputted in order as a stream for individual rows. Further, as described with reference to FIG. 11, as regards an image of the highest resolution such as a 4/1 demosaic image, only every other frame by a predetermined number N (N is a natural number) from among frames to be displayed as a moving picture are determined as a transmission target. Then, data for one frame are placed into a synthesis image for N+1 frames.

Also the outputting order of images of the highest resolution at this time is set to one of the outputting orders (1) and (2) described hereinabove or is changed over between the outputting orders (1) and (2). The communication unit 44 transmits a stream of a synthesis image formed in such a manner as described above to the display apparatus 16. It is to be noted that the timing at which outputting preparations are completed differs from that of the image pickup apparatus 12 depending upon the substance of the image processing by the host terminal 20. Therefore, also the configuration of the synthesis image varies in response to this.

The display apparatus 16 includes a communication unit 402, a data separation unit 404, FIFO buffers 408, 412, and 416, and enlargement units 410, 414, and 418. The communication unit 402 is an interface which performs transmission and reception of image data and necessary information to and from the host terminal 20. The data separation unit 404 separates image data transmitted thereto from the host terminal 20 into data for individual kinds of images. The FIFO buffers 408, 412, and 416 retain part of separated image data or data of enlarged images of them in a unit of a row. The enlargement units 410, 414, and 418 interpolate data stored in the FIFO buffers 408, 412, and 416, respectively, and output data of enlarged images. The display apparatus 16 further includes a frame memory 406, a display image production unit 420, a display unit 422, and a line-of-sight detection unit 424. The frame memory 406 stores part of image data separated by the data separation unit 404 in a unit of a frame therein. The display image production unit 420 produces a display image using different kinds of images, and the display unit 422 displays the display image produced by the display image production unit 420. The line-of-sight detection unit 424 detects a location of the display image which is gazed by the user.

The communication unit 402 receives image data in the form of a stream transmitted thereto from the host terminal 20. Further, the communication unit 402 transmits information detected by the line-of-sight detection unit 424 and relating to a location gazed by the user to the host terminal 20. The data separation unit 404 separates a plurality of kinds of images configuring the transmitted image data and stores the data selectively into the FIFO buffers 408 and 412 and the frame memory 406.

In the following, it is assumed that three kinds of images including a 4/1 demosaic image, a 1/1 demosaic image, and a 1/4 demosaic image as exemplified in FIG. 11 are included in a synthesis image. However, it is intended that the present embodiment is not limited to this. In this case, the 4/1 demosaic image is stored into the frame memory 406; the 1/1 demosaic image is stored into the FIFO buffer 408; and the 1/4 demosaic image is stored into the FIFO buffer 412. Thereafter, by enlarging the 1/1 demosaic image to four times and enlarging the 1/4 demosaic image to 16 times, the size of the images appearing after the enlargement is adjusted to the size of the 4/1 demosaic image.

The FIFO buffers 408 and 412 are individually configured from a plural number of (two in the figure) line buffers for retaining pixel values of one horizontal row of the 1/1 demosaic image and the 1/4 demosaic image. In particular, where the number of pixels of a horizontal row of the 1/1 demosaic image is represented by W, each line buffer of the FIFO buffer 408 retains W pixel values, and each line buffer of the FIFO buffer 412 retains W/2 pixel values.

Figure 14:
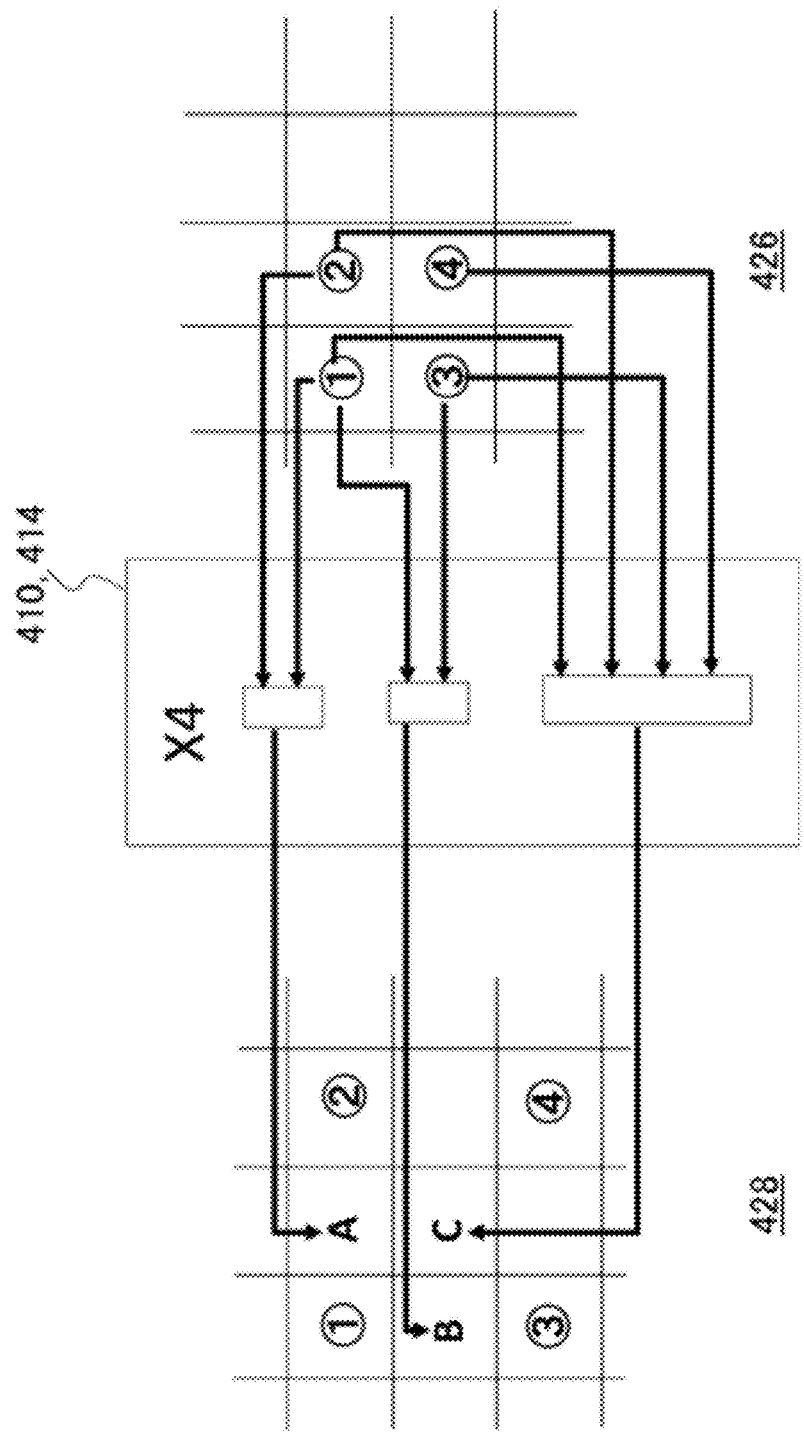
FIG. 14 is a diagrammatic view illustrating an example of an enlargement process of an image by an enlargement unit depicted in FIG. 13.

The enlargement units 410 and 414 interpolate the data stored in the FIFO buffers 408 and 412 with pixels to enlarge the data to twice in both of the vertical and horizontal directions. FIG. 14 illustrates an example of an enlargement process of images by the enlargement units 410 and 414. Particularly, FIG. 14 depicts, at a right side portion thereof, part of pixel strings 426 stored in the FIFO buffers 408 and 412. When an image is to be enlarged to 2×2 times, it is necessary to add one pixel in horizontal, vertical, and oblique directions per one pixel.

The value of pixels to be added in the horizontal direction and the vertical direction is an average value of pixel values of two pixels adjacent in the respective directions. The value of a pixel to be added in an oblique direction is an average value of pixel values of four pixels adjacent in the horizontal direction, the vertical direction, and the oblique directions. Where a pixel denoted by "1" from within the pixel string 426 in FIG. 14 is selected as an object, between the pixel denoted by "1" and the pixel denoted by "2" which is adjacent on the right side to the pixel denoted by "1," a pixel "A" is added whose pixel value is an average value of the pixel values of the pixels denoted by "1" and "2." Meanwhile, between the pixel denoted by "1" and the pixel denoted by "3" which is adjacent on the lower side of the pixel denoted by "1," a pixel "B" is added whose pixel value is an average value of the pixel values of the two pixels. Further, between the pixel denoted by "1" and the pixel denoted by "4" which is adjacent on the right lower side of the pixel denoted by "1," a pixel "C" is added whose pixel value is an average value of the pixel values of the pixels denoted by "1," "2," "3," and "4."

By repeating the process described above for the pixels of the pixel string 426, a pixel string 428 of an image enlarged to four times is produced. Since, according to the technique just described, one pixel row between two pixel rows is produced from the two pixel rows, the FIFO buffers 408 and 412 are individually configured from two line buffers. However, for the enlargement technique of an image, any other one of general techniques may be adopted. The number of line buffers to configure the FIFO buffers 408 and 412 is determined in accordance with the adopted enlargement technique.

Referring back to FIG. 13, the FIFO buffer 416 is configured from a plurality of (two in FIG. 13) line buffers for retaining pixel values for one horizontal row of a 1/4 demosaic image expanded by the enlargement unit 414. In other words, the FIFO buffer 416 retains W pixel values per one line buffer. The enlargement unit 418 interpolates the data stored in the FIFO buffer 416 with pixels to enlarge the 1/4 demosaic image by two pixels in the vertical direction and the horizontal direction. The enlargement technique by the enlargement unit 418 may be similar to that described hereinabove with reference to FIG. 14. In this case, the FIFO buffer 416 is configured from two line buffers.

The display image production unit 420 synthesizes a 4/1 demosaic image stored in the frame memory 406, a 1/1 demosaic image outputted from the enlargement unit 410 and enlarged to four times, and a 1/4 demosaic image outputted from the enlargement unit 418 and enlarged to 16 times to produce one display image. By synthesizing the demosaic images such that the original image is re-constructed on the basis of positions and sizes of regions represented by the images, a display image having difference levels of detail depending upon regions in the image can be produced.

The display image production unit 420 performs the production process of a display image for each row and outputs the produced display image immediately to the display unit 422. In particular, if the display image production unit 420 acquires data for each row outputted from the enlargement units 410 and 418, then it immediately performs a production process for the row and outputs the resulting data so as to be synchronized with scanning by the display unit 422. Consequently, processing from acquisition of image data by the communication unit 402 to display by the display unit 422 can be performed with low latency.

Here, when data for one frame of a 4/1 demosaic image from N+1 frames of the display image are acquired in the raster order as in the case of the outputting order (1) as described above, the display image production unit 420 updates a region to be represented using a 4/1 demosaic image for N every other frame of the display image. For example, where N=1, when the frames F1, F3, . . . from among the frames F0, F1, F2, F3, . . . of the display image are to be produced, data of rows corresponding to the frames F0, F2, . . . are read out from the frame memory 406 and synthesized into the corresponding region.

Meanwhile, when data of a 4/1 demosaic image from frames of the display image are acquired in N every other row in the case of the outputting order (2) as describe above, the display image production unit 420 updates the target row of a region to be represented using the 4/1 demosaic image with every frame of the display image. For example, where N=1, when the frames F0, F1, F2, F3, . . . of the display image are to be produced, data of odd-numbered rows of the image frame F0, even-numbered rows of the image frame F0, odd-numbered rows of the image frame F2, even-numbered rows of the image frame F2, . . . are read out from the frame memory 406 and synthesized into the corresponding region. Which one of the outputting orders (1) and (2) is to be adopted may be decided from the structure of the received stream or identification information which designates one of the outputting orders (1) and (2) may be included into the stream by the host terminal 20.

The line-of-sight detection unit 424 detects at which location of the image displayed in this manner the user gazes. The line-of-sight detection unit 424 notifies the host terminal 20 of a result of the detection through the communication unit 402. Consequently, the host terminal 20 can determine a region centered at the location gazed by the user in which the resolution is to be raised to highest level and determine another region around the determined region as a region in which the resolution is to be raised to the second highest level. For example, if it is requested to the image pickup apparatus 12 that a 4/1 demosaic image be placed into the former region; a 1/1 demosaic image be placed into the latter region; and a 1/4 demosaic image be placed into the overall region, then the image pickup apparatus 12 can use the data of the images to display an image in which the level of detail increases toward the location gazed by the user.

It is to be noted, however, that the region in which the level of detail is to be increased is not limited to this, but a region which is significant in an image such as the face of a user who is an image pickup object may be specified by different means. In this case, the function of the line-of-sight detection unit 424 may be omitted, and the host terminal 20 may specify the region by image analysis. Alternatively, the host terminal 20 itself may produce image data of a plurality of resolutions as described hereinabove. It is to be noted that the host terminal 20 may transmit similar data to a host terminal of a different information processing system through the network 18.

Figure 15:
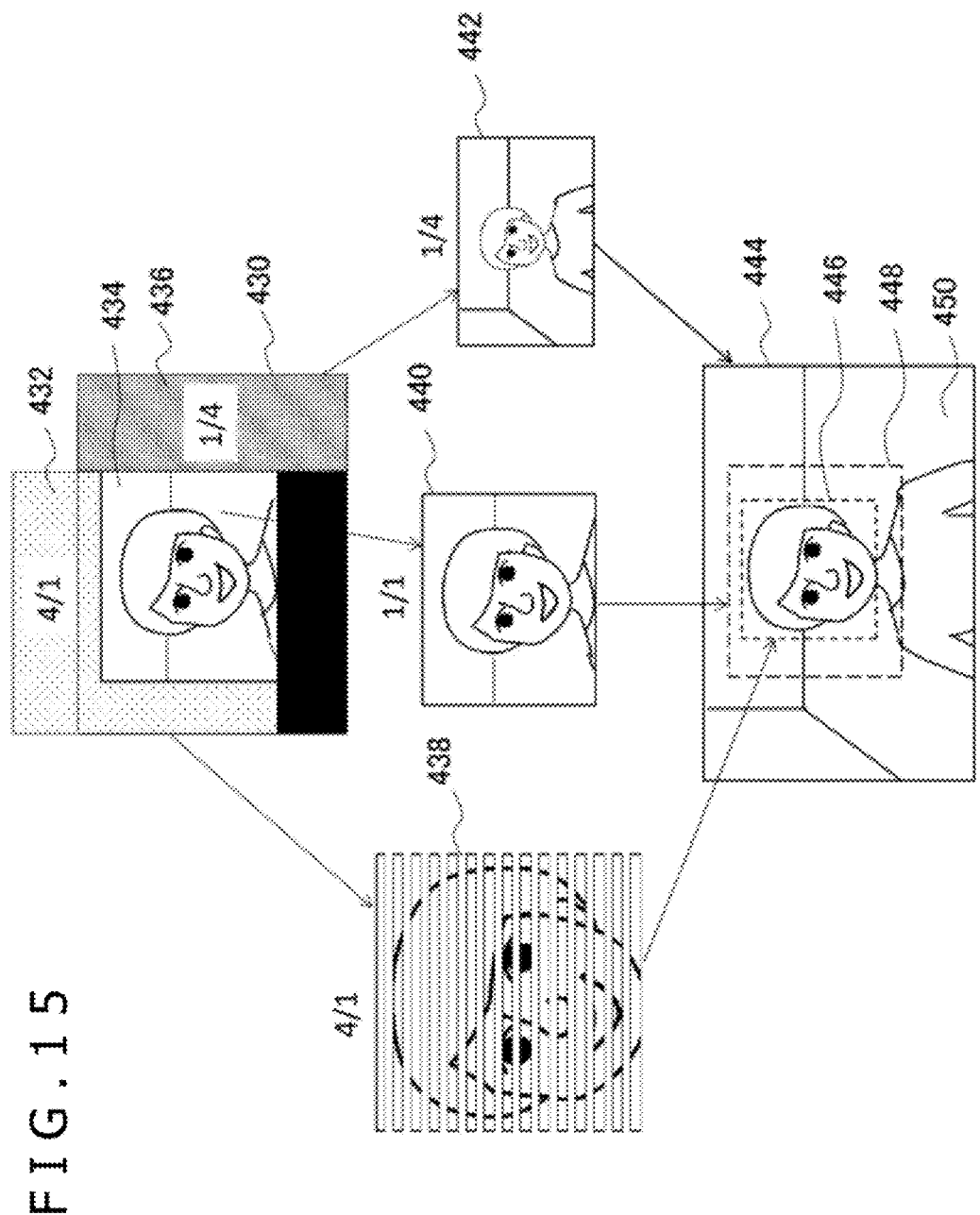
FIG. 15 is a view schematically depicting a manner in which the display apparatus produces a display image using image data transmitted from the host terminal.

FIG. 15 schematically illustrates a manner in which a display image is produced in the display apparatus 16 using image data transmitted from the host terminal 20. The upper stage in FIG. 15 depicts a synthesis image 430 produced by the host terminal 20. The synthesis image 430 has a configuration basically similar to that of a synthesis image produced by the image pickup apparatus 12. The synthesis image 430 has a region 432 for a 4/1 demosaic image, a region 434 for a 1/1 demosaic image, and a region 436 for a 1/4 demosaic image disposed separately from each other therein.

The synthesis image 430 is transmitted in a raster order from the host terminal 20 to the display apparatus 16. The data separation unit 404 stores data of the 4/1 demosaic image 438 in the synthesis image 430 into the frame memory 406 and stores data of the 1/1 demosaic image 440 and the 1/4 demosaic image 442 into the FIFO buffer 408 and the FIFO buffer 412, respectively. However, similarly as in the description given with reference to FIG. 12, data of the 4/1 demosaic image are transmitted for one frame thereof with respect to data of N+1 frames of the images of the other resolutions, the synthesis image 430 of one unit corresponding to the display frames includes data for 1/(N+1) frame thereof.

In FIG. 15, an example wherein N=1 and only odd-numbered rows or even-numbered rows of a 4/1 demosaic image are stored in the frame memory 406 is illustrated. Depending upon the transmission mode, an upper half or a lower half of a 4/1 demosaic image is stored. Then, the 1/1 demosaic image is enlarged to four times by the enlargement unit 410, and the 1/4 demosaic image is enlarged to 16 times by the enlargement units 414 and 418. The display image production unit 420 synthesizes the enlarged images at respective original positions to produce a display image 444. It is to be noted that, in FIG. 15, the display image 444 is depicted in a reduced scale.

As a result, the display image 444 is configured from a region 446 in which the data of the 4/1 demosaic image are used, another region 448 in which the data of the 1/1 demosaic image are used, and a further region 450 in which the data of the 1/4 demosaic image are used, and is an image in which the level of detail increases toward a significant portion such as the face. However, the region 446 in which the data of the 4/1 demosaic image are used are updated in N every other row at an updating rate equal to 1/(N+1) time or equal to that of the other regions 448 and 450.

It is to be noted that, while, in the display image 444 depicted in FIG. 15, the region 446 in which the data of the 4/1 demosaic image are used and the region 448 in which the data of the 1/1 demosaic image are used have rectangular shapes which reflect the images 438 and 440 before the synthesis as they are. However, alpha blending may be applied so that the synthesis may look more naturally. For example, circular or elliptical alpha masks which individually inscribe the region of an image are prepared such that the inside thereof is transparent; the outside thereof is opaque; and the boundary thereof is semi-transparent. By using the masks upon synthesis, such a natural image that the regions have circular or elliptical shapes and the level of detail gradually changes on the boundary between the regions can be displayed.

In such an image display procedure as described above, if it is taken into consideration that the display image 444 is displayed in a raster order on the display unit 422, corresponding rows of a 1/1 demosaic image and a 1/4 demosaic image are preferably inputted at the same time. Further, image data are transmitted preferably with a uniform data size within all periods. As a result, it is most efficient to produce and transmit a synthesis image with arrangement same as that of the synthesis image produced by the image pickup apparatus 12. Consequently, it becomes possible to perform processing in an inputting order of a stream transmitted from the host terminal 20, and it becomes possible to display with low delay with respect to transmission from the host terminal 20.

On the other hand, in order to cause data outputting to be in time with display of the same frame to the utmost at a timing at which a 4/1 demosaic image is updated, it is necessary to have data of the row of the display target stored already in the frame memory 406. Accordingly, as depicted in FIG. 15, the synthesis image 430 to be transmitted from the host terminal 20 is configured such that the region 432 of the data of the 4/1 demosaic image representing a new frame is positioned on the upper side of the region 434 of the 1/1 demosaic image of the same frame.

In particular, before transmission of a 1/1 demosaic image or a 1/4 demosaic image of a certain frame is started, transmission of data of a 4/1 demosaic image of the same frame is started. It is to be noted that, also in this case, if the size of the region 446 to be represented using the data of the 4/1 demosaic image is determined such that the region of data for one frame is completed within the synthesis image for N+1 frames of the display image, then globally an image of a corresponding frame can normally be synthesized.

On the other hand, as occasion demands, a synthesis image to be transmitted from the host terminal 20 may be configured similarly to a synthesis image to be transmitted from the image pickup apparatus 12 to the host terminal 20. In particular, starting of transmission of a 4/1 demosaic image may be set to the same timing as that of starting of outputting of 1/1 demosaic image such that the former is transmitted following the latter. When it is desired to immediately display an image picked up by the image pickup apparatus 12 as in the case of the head-mounted display unit described hereinabove, the host terminal 20 can give priority to the display rate of a 1/1 demosaic image and a 1/4 demosaic image by transmitting the various data in the order transmitted from the image pickup apparatus 12. In this case, although there is the possibility that the 4/1 demosaic image may be displayed after a delay by one frame, if the movement of the entire field of view sufficiently follows up as described hereinabove, the possibility that it may give a disagreeable feeling is low.

Figure 16:
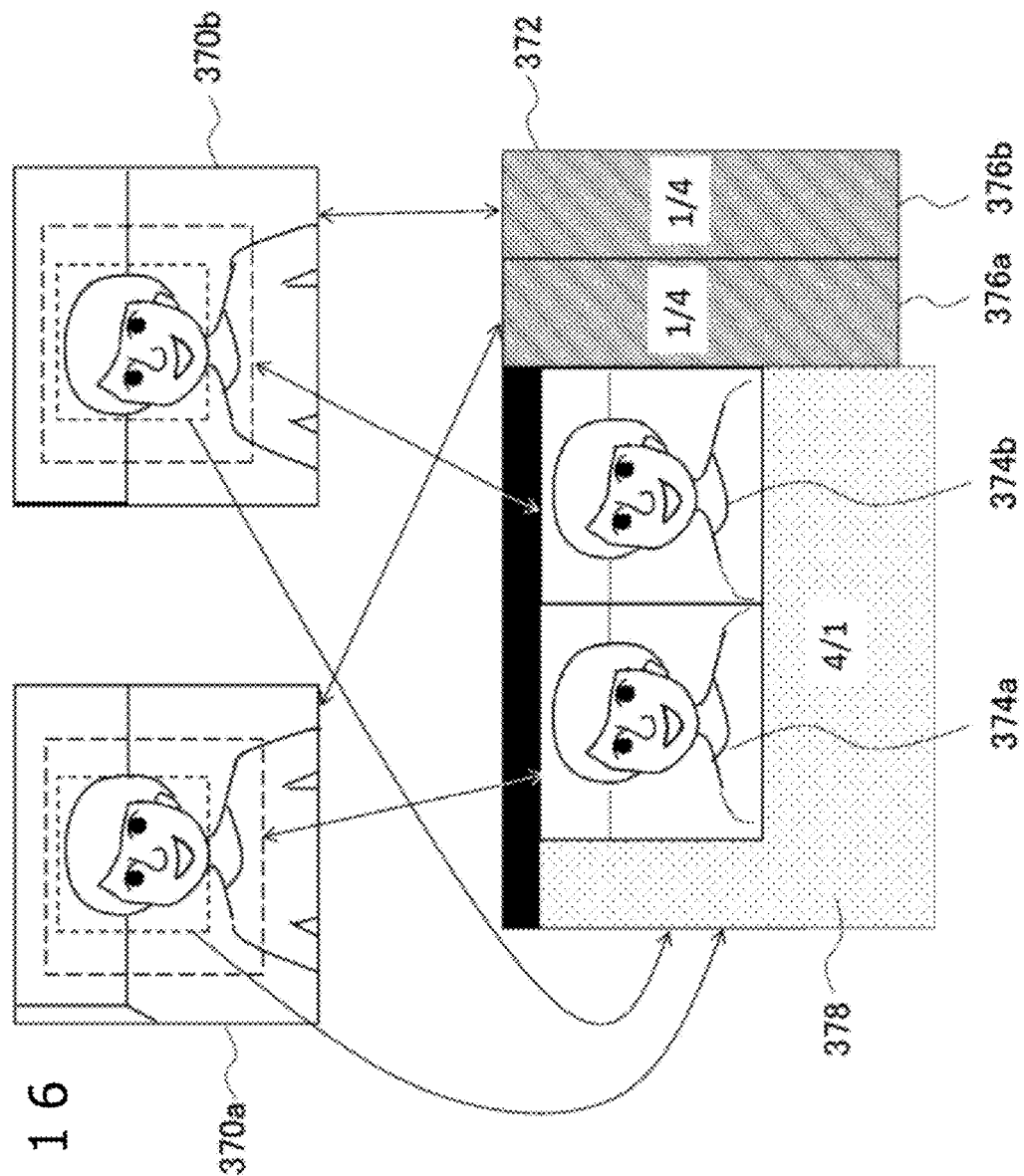
FIG. 16 is a view illustrating a configuration of image data outputted where a stereo camera is provided in the image pickup apparatus.

FIG. 16 is a view illustrating a configuration of image data outputted when a stereo camera is provided in the image pickup apparatus 12. In this case, the two cameras have the structure depicted in FIGS. 3 and 4 and each transmits image data produced thereby to the image sending unit 32. In the image sending unit 32, the frame memory 150 and the FIFO buffers 170, 172, 174, and 176 depicted in FIG. 5 corresponds to each of the cameras and are provided in each of two.

At an upper stage in FIG. 16, picked up images 370a and 370b are represented in a size of a 1/1 demosaic image of the reference. Although the policy regarding the data outputting order by the data extraction unit 184 is basically similar to that of a monocular camera, upon outputting of a 1/1 demosaic image, the left and right image data for one row are outputted in a connected relationship to each other. Further, upon outputting of a 1/4 demosaic image, the left and right image data for 1/2 row are outputted in a connected relationship to each other. As regards a 4/1 demosaic image, after outputting of data in a requested region of one of the images is completed, data of the other image are outputted continuously.

As a result, if a region similar to that depicted in FIG. 10 is requested, then a synthesis image 372 is configured, as depicted in FIG. 16, from regions 374a and 374b of data of 1/1 demosaic images of the left and right images, regions 376a and 376b of data of 1/4 demosaic images of the left and right images, and a region 378 of data of a 4/1 demosaic image. Data of the left and right images are included also in the region 378 of the data of the 4/1 demosaic image. Further, by transmitting data for one frame of the 4/1 demosaic image with respect to data for N+1 frames of an image of a different resolution, data of 1/(N+1) of the transmitted data are included on the synthesis image 372 of one unit.

Where the display apparatus 16 is formed as a head-mounted display unit and left and right images based on an image picked up by a stereo camera and having a parallax therebetween are displayed in left and right regions into which the display screen is divided, also image data to be transmitted from the host terminal 20 to the display apparatus 16 may have a similar configuration. In this case, from among the functional blocks of the display apparatus 16 depicted in FIG. 13, the frame memory 406, the FIFO buffers 408, 412, and 416 and the enlargement units 410, 414, and 418 are provided for each of the left and right images. Further, the display image production unit 420 performs a process for outputting a left side image and a right side image of the display screen image in this order for each row.

Then, if the synthesis image 372 is transmitted in the stream format from the host terminal 20, then the data separation unit 404 of the display apparatus 16 divides the synthesis image 372 into data of three kinds of images for each of the left and right images, namely, into data of totaling six kinds of images, in the transmitted order. Then, the data separation unit 404 performs, for each of the left and right images, a process for enlarging the 1/1 demosaic image and the 1/4 demosaic image to four times and sixteen times, respectively, and synthesizing the enlarged images with the 4/1 demosaic image. Then, for each row for which the process is completed, the left and right image data are outputted in a horizontally connected relationship to each other. Consequently, on the display unit 422, a display image including the picked up images 370a and 370b connected leftwardly and rightwardly to each other is displayed.

Also in this case, similarly as in the description given hereinabove with reference to FIG. 15, in an outputting process in a raster order in which data of the 1/4 demosaic image, which represents the entire image, after the enlargement, if the region of the 1/1 demosaic image is reached, then the data of the image after the enlargement are successively outputted. In the case of the 4/1 demosaic image, if a row of a region represented by the data is reached at a point of time at which an updating timing comes, then the data are outputted. Consequently, at least with regard to the overall region, an image can be displayed with a small delay from the data transmission from the host terminal 20. Further, since there is no necessity to develop an overall region of the 1/1 demosaic image and the 1/4 demosaic image in the display apparatus 16, a line buffer of a small capacity can be used.

It is to be noted that, though not depicted, the host terminal 20 may perform an image process so as to provide compatibility with the display method of the display unit. For example, in the case of a head-mounted display unit, it seems recommendable to provide lenses so as to be positioned in front of the eyes of the user when the head-mounted display unit is mounted on the user thereby to widen the field of view and allow display images to be displayed stereoscopically thereby to produce a sense of immersion. In this case, the host terminal 20 performs distortion correction for the display images such that, the user can appropriately see the original images through the lens. Further, as described hereinabove with reference to FIG. 15, starting of data transmission of the 4/1 demosaic image may be performed prior to that of images of the other resolutions of the same frame.

In any case, in the mode in which data of left and right parallax images are transmitted in this manner, the data amount to be transmitted increases in comparison with that in the case of a monocular image. Accordingly, as described hereinabove, it is particularly effective to suppress, by performing data transmission of an image of the highest resolution in N every other row, the data transmission amount per unit time, namely, the area of the image occupying the synthesis image to be transmitted, small. Also in this case, by cyclically connecting the data to images of the other kinds in a unit of an appropriate number of pixels and transmitting the resulting data successively, the transmission bandwidth can be made the most while the immediacy of data transmission is maintained.

Figure 17:
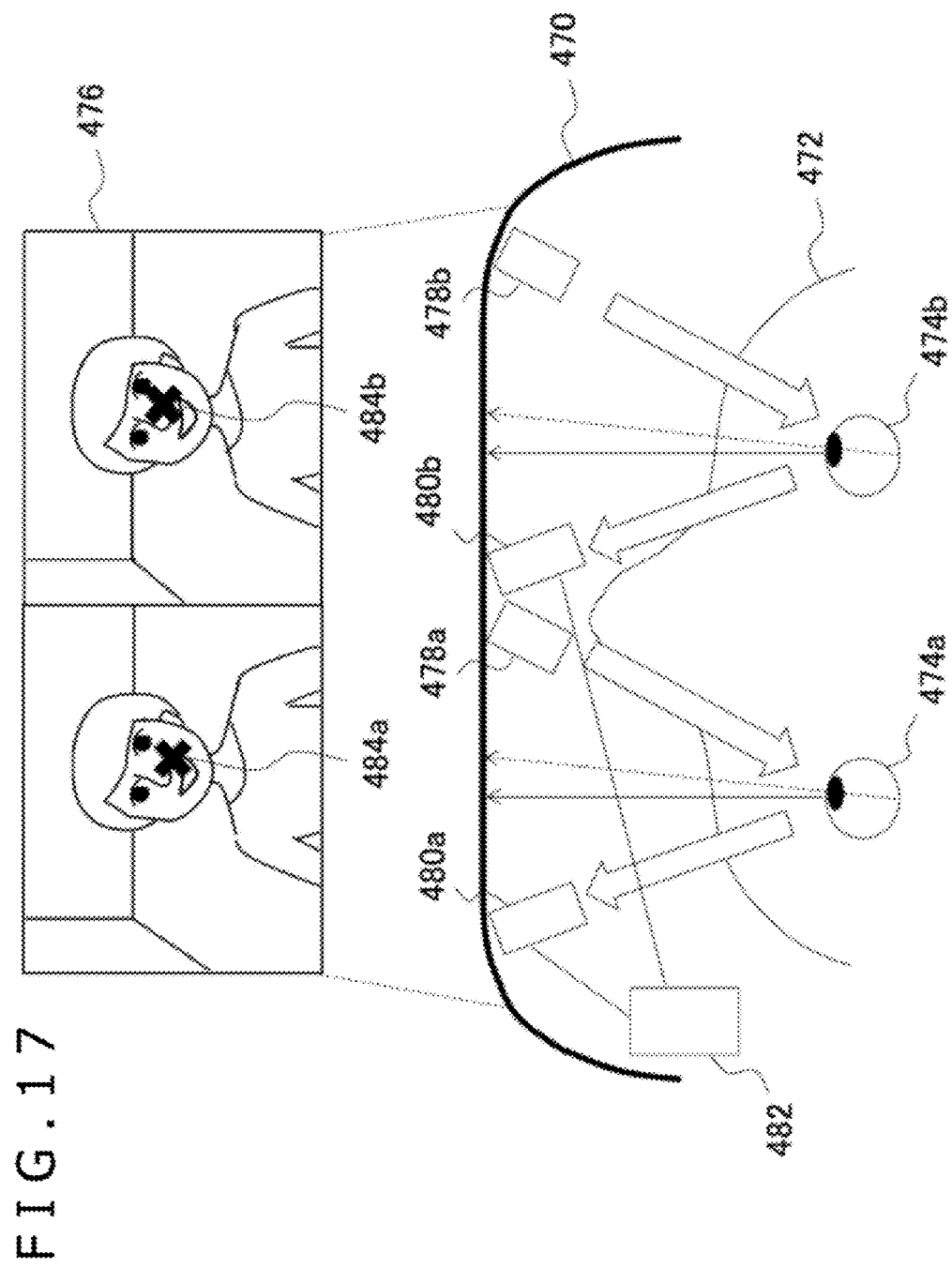
FIG. 17 is a view depicting an example of a configuration of a line-of-sight detection unit of the display apparatus.

FIG. 17 depicts an example of a configuration of the line-of-sight detection unit 424. The lower stage of FIG. 17 schematically illustrates a manner in which a head-mounted display unit 470 and a head 472 of a user who wears the head-mounted display unit 470 are viewed from above. Such a display image 476 as depicted at the upper stage of FIG. 17 is displayed on the head-mounted display unit 470, and the user views the display image 476 with the left and right eyes 474a and 474b. Here, the line-of-sight detection unit 424 includes infrared light-emitting diodes (LEDs) 478a and 478b, infrared cameras or position sensitive detector (PDS) sensors 480a and 480b, and an image analysis apparatus 482.

The infrared LEDs 478a and 478b irradiate infrared rays on the left and right eyes 474a and 474b of the user. The infrared cameras or the PDS sensors 480a and 480b pick up images of the left and right eyes 474a and 474b of the user and supply data of the images to the image analysis apparatus 482. The image analysis apparatus 482 specifies reflection positions of the infrared rays from the corneas and positions of the pupils from the picked up images of the left and right eyes and specifies the line of sight of the user from the positional relationship of the positions. This technique is utilized as corneal reflection method in the field of line-ofsight detection technologies. It is to be noted that the technique for detecting the line of sight is not limited to this, but any of general techniques such as, for example, a technique of picking up images of the left and right eyes using visible light cameras and specifying the line of site from the positional relationship between the inner corners of the eyes and the irises may be adopted.

The image analysis apparatus 482 detects coordinates of the positions of crossing points 484a and 484b between the lines of sight detected in such a manner as described above and the display image 476 and transmits the information of the coordinates to the host terminal 20. The information processing unit 38 of the host terminal 20 determines, from within the picked up images, a region of a predetermine range including the position coordinates as a region which represents a 4/1 demosaic image and determines a region of a predetermined range around the former region as a region which represents a 1/1 demosaic image. Then, depending upon whether a request for data transmission in accordance with the determination is issued to the image pickup apparatus 12 or the image extraction unit 400 itself of the host terminal 20 performs a cutting out process, data of the image are transmitted to the display apparatus 16. By performing this process continuously, a display image in which a place having a high level of detail moves in response to a movement of the gazing point can be displayed with low latency.

Here, the information processing unit 38 of the host terminal 20 may change over the combination of kinds or the transmission mode of image data to be used in a display image on the basis of the movement of the line of sight acquired by the image analysis apparatus 482. For example, in a situation in which the entire display image is moving, the movement of the angle of view is more significant than details of individual objects included in the display image. On the other hand, in another situation in which one place of a display image is gazed, the level of detail of the place is significant. In a head-mounted display unit in which an image is displayed while the angle of view is moved so as to match with the field of view of the user, it is considered that the situations mentioned exchange frequently.

Therefore, the information processing unit 38 decides on the basis of the movement of the line of sight whether or not the user is gazing a target object. Then, if it is decided that the user is gazing a target object, then the information processing unit 38 determines data of a transmission target such that a predetermined region centered at the gazed point is represented by data of the highest resolution of a 4/1 demosaic image or the like. If it is decided that the user is not gazing a target object, then the information processing unit 38 excludes the data of the highest resolution from the transmission target. Alternatively, when a display image is produced, the information processing unit 38 requests the display apparatus 16 to synthesize an image of the highest resolution only when the target object is being gazed by the user. It is to be noted that the modes mentioned may be combined. Alternatively, the decision regarding whether or not the user is gazing may be performed by the line-of-sight detection unit 424 of the display apparatus 16.

Figure 18:
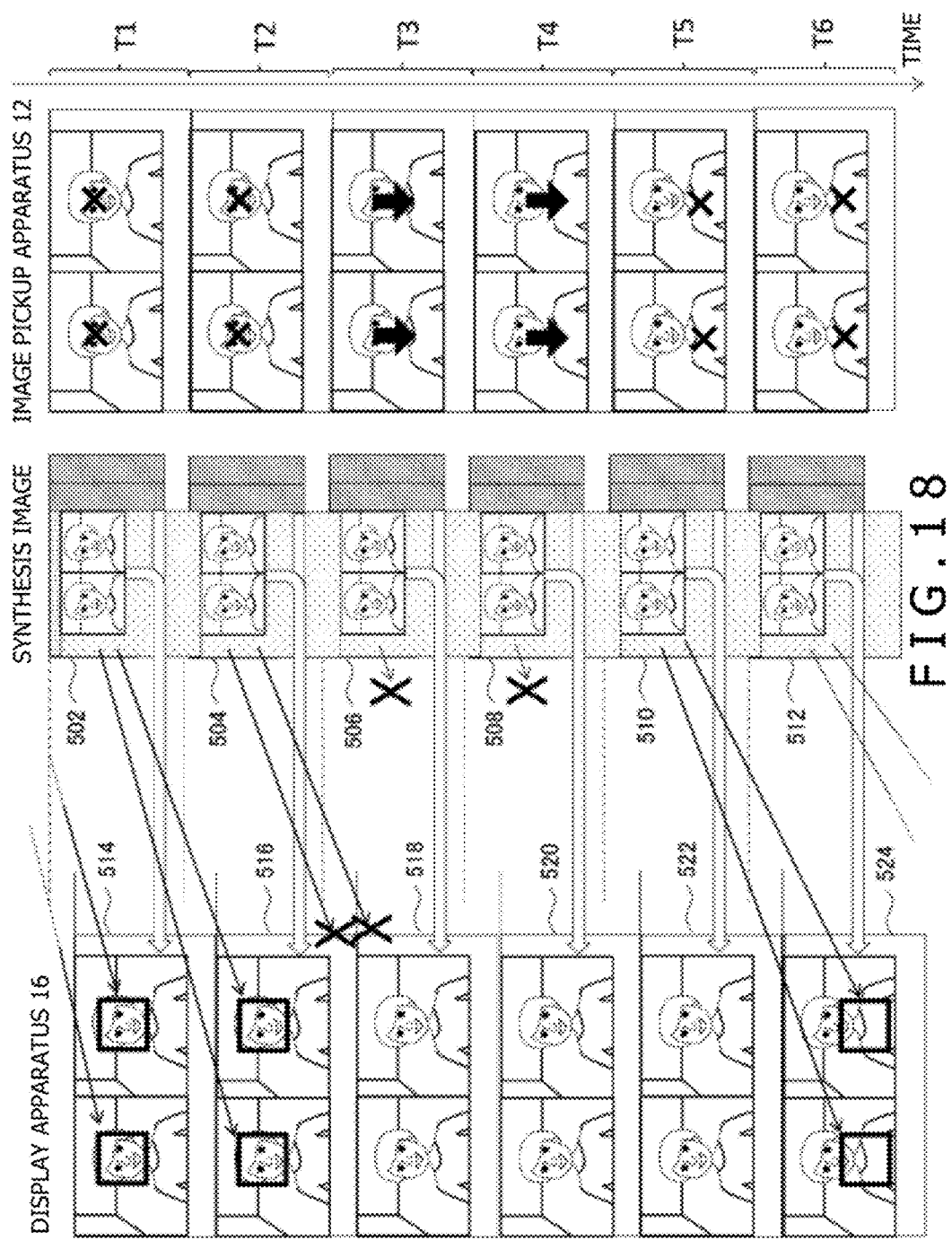
FIG. 18 is a view schematically illustrating a manner in which the kind of image data to be used for a display image is changed over in response to a movement of a line of sight.

FIG. 18 schematically illustrates a manner in which the kind of image data to be used for a display image is changed over in response to the movement of the line of sight. In FIG. 18, the vertical direction indicates a time axis, and at different time steps, data acquired by horizontal scanning by the stereo camera provided in the image pickup apparatus 12 are depicted at the right end; synthesis images generated and transmitted on the basis of the data are depicted in the middle; and display images to be outputted on the basis of the synthesis images outputted from the head-mounted display unit which configures the display apparatus 16 are depicted at the left end.

It is to be noted that FIG. 18 supposes a mode in which a picked up image is displayed immediately on the display apparatus 16. At this time, the host terminal 20 outputs a data stream transmitted thereto from the image pickup apparatus 12 in the same order to the display apparatus 16. Accordingly, the 4/1 demosaic image is displayed after a delay by one frame from an image displayed using image data of any other resolution as described hereinabove. However, changeover of the utilization data based on the movement of the line of sight can be realized without depending upon the transmission timing and the display timing of the 4/1 demosaic image. Further, in a mode in which data of the 4/1 demosaic image are outputted in N every other frame, the corresponding region is updated at a rate lower than that of the other regions or in N every other row.

First, it is assumed that it is decided that, within and before an image pickup period T1 of a certain frame, the user is gazing one place of the display image. In FIG. 18, it is depicted that the gazing point is detected at the location of the face of a person indicated by a cross mark. Even when an object is gazed, the line of sight of a person demonstrates fine vibration of approximately 80 Hz called "involuntary eye movement." As a movement of the line of sight other than the involuntary eye movement, sliding eye movement (smooth pursuit) when a moving target object is pursued by the eyes, saccadic eye movement (saccade) when the line of sight is transferred to a different target object, vestibulo-ocular reflex (VOR) or optokinetic eye movement (optokinetic response (OKR)) which are reflex movements to a movement of the own head or of the surroundings, and so forth are available.

In order to decide that one place of a display image is gazed, it is necessary to identify the involuntary eye movement and the other movements of the line of sight. Therefore, for example, when a crossing point of a display image with the line of sight stays in a region within a predetermined range from a certain coordinate for more than a predetermined period of time, it is decided that the position of the coordinate is being gazed. In this case, into a synthesis image 502 to be transmitted, data of a region of the 4/1 demosaic image which includes the gazing point and has a size which depends upon the area or the like of the synthesis image are included. As a result, on the display apparatus 16, a display image 516 having a high level of detail in the region including the gazing point is displayed.

It is to be noted that an image of a frame picked up within the image pickup period T1 is displayed immediately as a display image 514 of an immediately preceding frame using data of the other resolutions. A region of the display image 514 in the proximity of the gazing point is displayed using data of the 4/1 demosaic image picked up within an immediately preceding period to the image pickup period T1. If it is decided that a similar location is gazed also with an image pickup period T2 of a next frame, then into a corresponding synthesis image 504, data of the 4/1 demosaic image in the region are included.

On the other hand, if it is decided within an image pickup period T3 of an immediately succeeding frame that the line of sight has moved as indicated by an arrow mark of a thick line, then the display image production unit 420 of the display apparatus 16 excludes the 4/1 demosaic image of the frame picked up within the image pickup period T2 from the synthesis image. In other words, the display image production unit 420 displays a display image 518 using only the data of the 1/1 demosaic image and the 1/4 demosaic image of the frame picked up within the image pickup period T3. Here, that "the line of sight has moved" signifies that movement other than involuntary eye movement has occurred, and this is decided when such a detection condition of involuntary eye movement as described above is not satisfied.

If it is tried to reflect a decision result regarding whether or not the user is gazing on the synthesis process of display images on the display apparatus 16, then even if there is a time difference by one frame after data of the 4/1 demosaic image are transmitted until they are displayed, whether or not synthesis is to be performed can be controlled immediately before production of a display image. If the user moves the line of sight by a great amount or moves the head thereby to vary the angle of view by a great amount, then it may be wasteful to form a region having a high level of detail in a display image. By deciding whether or not such a variation occurs from the presence or absence of gazing, it is possible for the display apparatus 16 not to perform a useless synthesis process.

Since the line of sight moves in such a manner as described above within the image pickup period T3, the data of the 4/1 demosaic image of the frame are excluded from the transmission target. At this time, the data of the 4/1 demosaic image may not be included into a synthesis image 506 to be transmitted or the data may be omitted at some place of the transmission path such that the data are excluded by the host terminal 20. In the former case, the region represented by an image of any other kind such as the 1/1 demosaic image may be increased in size within a range within which the transmission bandwidth is not changed such that a greater range may be represented by a middle level of detail.

In any case, the display apparatus 16 displays a display image 520 using only data of the 1/1 demosaic image and the 1/4 demosaic image of the frame picked up within an image pickup period T4. Also within the image pickup period T4, if the line of sight moves, then the data of the 4/1 demosaic image of the frame are excluded from the transmission target such as a synthesis image 508 similarly. As a result, the display apparatus 16 displays a display image 522 using only data of the 1/1 demosaic image and 1/4 demosaic image of the frame picked up within an image pickup period T5.

If, as a result of the movement of the line of sight in this manner, it is specified that the user gazes one place again within the image pickup period T5, then data of the 4/1 demosaic image in the region including the gazing point is included into a synthesis image 510 or the like to determine a transmission target. Consequently, the display apparatus 16 displays a display image 524 in which the level of detail in the region including the gazing point is raised from within the image corresponding to the frame within an image pickup period T6. It is to be noted that the changeover on the basis of the decision regarding whether or not the user is gazing is not limited to that on the basis of the decision regarding whether or not data of the highest resolution is to be transmitted.

For example, in the mode in which data of the highest resolution are transmitted in N every other row as described hereinabove, the outputting order of the data may be changed over between the outputting orders (1) and (2) described hereinabove. For example, when the user is gazing one place on the image, since it is considered that the movement of the entire display image including the movement of the field of view is small, the simultaneity of display takes precedence to the frame rate and the outputting order (1) is selected. On the other hand, when the user is moving the line of sight, the immediacy of display takes precedence so as to follow up the movement and the outputting order (2) is selected. Further, a mode in which data of the highest resolution are not transmitted may be combined. Alternatively, the combination of an image of a different resolution may be changed or the size of a region on the image may be changed.

FIG. 19 is a flow chart illustrating a processing procedure from image pickup to image display when the present embodiment is applied between the image pickup apparatus 12 and the host terminal 20 and between the host terminal 20 and the display apparatus 16. This flow chart is started, for example, when the user inputs a processing starting instruction to the host terminal 20. It is to be noted that, while FIG. 19 illustrates transmission and reception of data principally relating to image display, particularly the host terminal 20 may perform various information processes of a game not depicted in parallel to each other.

First, the image pickup apparatus 12 starts image pickup and transmits data of a picked up image to the host terminal 20 (S10). The host terminal 20 produces an initial image using the data and transmits the initial image to the display apparatus 16 (S12). The image data transmitted here may have a general structure for an initial image. The display apparatus 16 displays the data on the display unit 422 (S14). Consequently, such an initial state that the picked up image is displayed as it is as a display image is established. Then, the line-of-sight detection unit 424 detects the line of sight of the user and transmits information of position coordinates of a crossing point between the line of sight and the display image to the host terminal 20 (S16).

The host terminal 20 decides on the basis of the information of the position coordinate whether or not the user is gazing one place of the display image (S18). Then, the host terminal 20 decides, on the basis of a result of the decision, whether or not a request for data of a 4/1 demosaic image is to be issued and further determines, where the request is to be issued, a region on the image, an outputting order and so forth. Then, the host terminal 20 issues a request for the determination together with image data of the other resolutions to the image pickup apparatus 12 (S20). It is to be noted that, as regards the 1/1 demosaic image, if the user is gazing, then the host terminal 20 may request for a region in a predetermined range centered at the gazing place and greater than the 4/1 demosaic image, but if the user is not gazing, then the host terminal 20 may suitably specify the center of the display image, a region in which a principal target object exists or the like and request for the specified matter.

Further, the combination of images to be requested is not limited to this, but also a request for some partial region of the 1/4 demosaic image may be issued or a request for further demosaic images of 1/16 and so forth may be issued. The image pickup apparatus 12 extracts the requested region from the image of each of the resolutions of an image frame whose image pickup is started immediately after the request is received, and connects the extracted images for each row of the synthesis image and transmits the connected images (S22). At this time, as regards the 4/1 demosaic image, the number of pixel strings to be connected at a time such that images of the different kinds fill the rectangularly shaped remaining region of the synthesis image and besides outputting for one frame is completed for N+1 frames of the picked up image in the set outputting order.

By repeating the process at step S22 also for succeeding frames, data of uniform sizes continue to be transmitted to the host terminal 20 without interruption. The host terminal 20 separates the received image data for individual kinds of images and performs image working as occasion demands (S24) and then produces a synthesis image by a similar configuration again and transmits the synthesis image to the display apparatus 16 (S26). The host terminal 20 similarly processes also image data of the succeeding frames transmitted from the image pickup apparatus 12 and continues to transmit the newly formed synthesis images. Consequently, data of the uniform size continue to be transmitted to the display apparatus 16 without interruption.

When the display apparatus 16 receives the image data, it separates the image data for individual kinds of images and enlarges the separated image data suitably, and then synthesizes the image data such that they are displayed at original images on the picked up image to produce a display image and displays the display image (S28). However, with regard to the region in which the 4/1 demosaic image is to be utilized, the updating rate is set lower than that in the other regions or updating is performed in every other row by a predetermined number in response to the set outputting order. Further, when the line of sight of the user indicates some movement, even if data of the 4/1 demosaic image are received, the data are excluded from the synthesis target.

The line-of-sight detection unit 424 of the display apparatus 16 continues detection of the line of sight (S16). In response to the detected line of sight, the host terminal 20 specifies whether or not the user is gazing and, when the user is gazing, specifies the gazing point, and then suitably changes the contents of a request to the image pickup apparatus 12 in response to a result of the specification (S18 and S20). By repeating the processes at steps S16 to S28, the angle of view varies following up the movement of the head of the user who wears the head-mounted display unit, and a moving picture represented with an adaptive level of detail necessary and sufficient for the variation of the line of sight can be displayed. It is to be noted that, in place of the processes at steps S16 and S18, a different technique may be used to specify a region in which the host terminal 20 should raise the level of detail in a display region such as a face detection process or visual tracking.

With the present embodiment described hereinabove, image data which represent data of frames configuring a moving picture in a plurality of resolutions are connected in units of predetermined pixel strings and transmitted in the form of a stream to perform information processing or display the data. At this time, image data of a low resolution are outputted at timings corresponding to scanning in a camera or a display unit while image data of the highest resolution are outputted in a surplus bandwidth and data in every other frame by a natural number N set in advance are outputted. At this time, the output amount is adjusted such that outputting for one frame is completed with respect to outputting for N+1 frames of image data of the other resolutions.

As a result of such adjustment as described above, it is possible to keep fixed the data output amount per unit time period without depending upon the production timing of image data of a plurality of resolutions, and even if the transmission bandwidth is not expanded very much, it is possible to raise, for a necessary region, the resolution to be used for information processing to a maximum level or display an image having a high level of detail. As a result, a high degree of information processing or high-definition image display in which the performance of a camera or a display unit is taken advantage of sufficiently can be realized. Even with this, since image data of a low resolution can be transmitted after a small delay of a scanning line level, the immediacy from image pickup to display or from image data production to display is guaranteed.

This is especially effective in a mode in which a picked up image whose angle of view varies in response to a movement of a user is displayed immediately as in the case of a head-mounted display unit. In a head-mounted display unit, a scene in which it is significant to immediately reflect a variation of the angle of view by a movement of the user on a display image and another scene in which the user is gazing one place and the level of detail at the location is significant may frequently change places with each other. In the present embodiment, such replacement between the scenes is detected from a movement of a crossing point between the line of sight and the display image, and the combination of image data to be transmitted or the transmission mode is changed over in response to the detected interchange. Consequently, since data required in accordance with a situation can be transmitted preferentially, the transmission bandwidth can be utilized further efficiently.

The present technology has been described according to the embodiment thereof. The embodiment described hereinabove is illustrative, and it can be recognized by a person skilled in the art that various modifications can be made for combinations of the components and the processing procedures of the embodiment and that also the modifications are included in the spirit and scope of the present technology.

For example, in the embodiment described hereinabove, the mode is described in which, as depicted in FIG. 11 and so forth, outputting data of pixel strings of N every other row first and then outputting the data in N every other row while the row is successively displaced by one row in the same frame are repeated by N+1 times such that, for outputting for N+1 frames of images of the other resolutions, outputting for one frame of the highest resolution is completed. On the other hand, after data in N every other row are outputted, when the row is to be displaced, a pixel string may be extracted from a next frame similarly to the images of the other resolutions. In particular, although only data of the image of the highest resolution are transmitted from N every other row, the frame to be displayed may always be made correspond to the frame of the images of the other resolutions.

In this case, since data only of 1/(N+1) that of the image of the highest resolution are transmitted for one frame of the images of the other resolutions, a display apparatus or the like which acquires the data may interpolate the data to complete the image of the highest resolution in a unit of a frame. Even with this, it is possible to raise, for a necessary region, the resolution to be used for information processing in the maximum or display an image having a higher level of detail while an apparent influence or increase of the transmission bandwidth is suppressed. Selection of a transmission mode of image data of the highest resolution may be determined suitably depending upon the display substance or the load and so forth of a process permitted in the individual apparatus.

The present technology contains subject matter related to that disclosed in Japanese Priority Patent Application JP 2015-192144 filed in the Japan Patent Office on Sep. 29, 2015, the entire content of which is hereby incorporated by reference.

What is claimed is:

1. An information processing apparatus comprising:
an image acquisition unit configured to acquire data of images of a plurality of resolutions to be synthesized and displayed as an image frame which configures a moving picture;
an image extraction unit configured to connect pixel strings, which configure rows of the images of the plurality of resolutions, for each number of pixels determined by a given rule to produce a stream; and a communication unit configured to transmit the stream to a display apparatus, wherein the image extraction unit adjusts a connection pixel number of data of an image of a particular resolution such that, where N is an integer, data for 1/(N+1) frame are transmitted with respect to one frame of data of an image of an other resolution.

2. The information processing apparatus according to claim 1, further comprising an information processing unit configured to acquire information relating to a position coordinate of a crossing point between a line of sight of a user to an image displayed on the display apparatus and an image plane, decide whether or not one place of the image is being gazed by the user on the basis of a movement of the position coordinate, and then issue, when one place of the image is not gazed, a request to the display apparatus to exclude the image of the particular resolution from a target of the synthesis.

3. The information processing apparatus according to claim 1, wherein the image acquisition unit designates a region of data of the images of the plurality of resolutions and issues a request for data in the region to an image pickup apparatus which is picking up a moving picture and then acquires a stream wherein pixel strings of the images of the resolutions in the requested region are connected to each other for each number of pixels determined by a given rule from the image pickup apparatus, and the information processing apparatus further comprises an information processing unit configured to acquire information relating to a position coordinate of a crossing point between a line of sight of a user to an image displayed on the display apparatus and an image plane, decide whether or not one place of the image is being gazed by the user on the basis of a movement of the position coordinate, and then change over the substance of the request to the image pickup apparatus in response to a result of the decision.

4. The information processing apparatus according to claim 3, wherein the information processing unit excludes, when it is decided that the user is not gazing, data of the image of the particular resolution from a target of the request to the image pickup apparatus.

5. A display apparatus comprising:

a communication unit configured to receive, from a host terminal, a stream in which pixel strings configuring rows of images of a plurality of resolutions to be synthesized and displayed as an image frame which configures a moving picture are connected for each number of pixels determined by a given rule and which is adjusted such that, where N is an integer, a connection pixel number of data of an image of a particular resolution are received by 1/(N+1) frame with respect to one frame of data of an image of an other resolution; and a display unit configured to synthesize the images of the plurality of resolutions included in the received stream to produce and display the image frame;

wherein the display unit completes, for a region of the image frame in which the data of the image of the particular resolution are to be used, updating of the data for 1/(N+1) frame where updating regarding an other region is performed for one frame.

6. The display apparatus according to claim 5, wherein the display unit repeats a process for updating the region of the image frame in which the data of the image of the particular resolution are used in every other row by a plural number while the row of the target is successively displaced to complete updating for one frame.

7. The display apparatus according to claim 5, wherein the display unit performs changeover between a case in which a process for updating the region of the image frame in which the data of the image of the particular resolution are used in every other row by a plural number is repeated while the row of the target is successively displaced and another case in which the process is performed in an order of the rows in response to a connection order in the received stream.

8. The display apparatus according to claim 5, further comprising a line-of-sight detection unit configured to acquire a position coordinate of a crossing point between a line of sight of a user to a displayed image and an image plane, wherein the display unit excludes, when it is decided that one place of the image is not being gazed on the basis of a movement of the position coordinate, the image of the particular resolution from a target of the synthesis.

9. An image data sending method by an information processing apparatus, comprising:

acquiring data of images of a plurality of resolutions to be synthesized and displayed as an image frame which configures a moving picture;

connecting pixel strings, which configure rows of the images of the plurality of resolutions, for each number of pixels determined by a given rule to produce a stream; and transmitting the stream to a display apparatus, wherein the producing of the stream adjusts a connection pixel number of data of an image of a particular resolution such that, where N is an integer, data for 1/(N+1) frame are transmitted with respect to one frame of data of an image of an other resolution.

10. An image displaying method by a display apparatus, comprising:

receiving, from a host terminal, a stream in which pixel strings configuring rows of images of a plurality of resolutions to be synthesized and displayed as an image frame which configures a moving picture are connected for each number of pixels determined by a given rule and which is adjusted such that, where N is an integer, a connection pixel number of data of an image of a particular resolution are received by 1/(N+1) frame with respect to one frame of data of an image of an other resolution; and synthesizing the images of the plurality of resolutions included in the received stream to produce and display the image frame, wherein the displaying completes, for a region of the image frame in which the data of the image of the particular resolution are to be used, updating of the data for 1/(N+1) frame where updating regarding an other region is performed for one frame.

11. A non-transitory computer readable medium having stored thereon a computer program for a computer, the program comprising:

by an image acquisition unit, acquiring data of images of a plurality of resolutions to be synthesized and displayed as an image frame which configures a moving picture;

by an image extraction unit, connecting pixel strings, which configure rows of the images of the plurality of resolutions, for each number of pixels determined by a given rule to produce a stream; and by a communication unit, transmitting the stream to a display apparatus, wherein the producing of the stream adjusts a connection pixel number of data of an image of a particular resolution such that, where N is an integer, data for $1/(N+1)$ frame are transmitted with respect to one frame of data of an image of an other resolution.

12. A non-transitory computer readable medium having stored thereon a computer program for a computer, the program comprising:

by a communication unit, receiving, from a host terminal, a stream in which pixel strings configuring rows of images of a plurality of resolutions to be synthesized and displayed as an image frame which configures a moving picture are connected for each number of pixels determined by a given rule and which is adjusted such that, where N is an integer, a connection pixel number of data of an image of a particular resolution are received by $1/(N+1)$ frame with respect to one frame of data of an image of an other resolution; and by a display unit, synthesizing the images of the plurality of resolutions included in the received stream to produce and display the image frame, wherein the displaying completes, for a region of the image frame in which the data of the image of the particular resolution are to be used, updating of the data for $1/(N+1)$ frame where updating regarding an other region is performed for one frame.

* * * * *